(12) United States Patent
Miller et al.

(10) Patent No.: US 7,200,573 B2
(45) Date of Patent: Apr. 3, 2007

(54) SYSTEM AND METHOD FOR PROVIDING WARRANTIES IN ELECTRONIC COMMERCE

(75) Inventors: Lawrence R. Miller, Redding, CT (US); Khaja E. Ahmed, Pleasanton, CA (US); Navin Vasanthakumar, Basking Ridge, NJ (US); Mark Robinson, Sutherland (GB); Jeffrey F. Boyd, New York, NY (US); Deborah Goldstein, Brooklyn, NY (US); Peter Cerra, Hamilton, NJ (US)

(73) Assignee: IdenTrust, Inc., San Francisco, CA (US)

( * ) Notice: Subject to any disclaimer, the term of this patent is extended or adjusted under 35 U.S.C. 154(b) by 0 days.

(21) Appl. No.: 10/693,724

(22) Filed: Oct. 23, 2003

(65) Prior Publication Data

US 2004/0088263 A1 May 6, 2004

Related U.S. Application Data

(63) Continuation of application No. PCT/US01/25388, filed on Aug. 14, 2001.

(60) Provisional application No. 60/259,796, filed on Jan. 4, 2001, provisional application No. 60/224,994, filed on Aug. 14, 2000.

(51) Int. Cl.
*G06Q 40/00* (2006.01)
(52) U.S. Cl. .............................. 705/44; 705/26; 705/27
(58) Field of Classification Search ............ 705/26–27, 705/76, 44
See application file for complete search history.

(56) References Cited

U.S. PATENT DOCUMENTS 5,557,518 A * 9/1996 Rosen ........................ 705/69
5,903,882 A * 5/1999 Asay et al. .................... 705/44
6,044,350 A * 3/2000 Weiant et al. ................. 705/1

(Continued)

FOREIGN PATENT DOCUMENTS

WO     WO 99/22291     * 5/1999

OTHER PUBLICATIONS

Solomon, Howard; "Canadian banks vault into e-com identity service," Computing Canada, Jun. 4, 1999, v25i22p. 23; Proquest #42244579, 3pgs.*

(Continued)

*Primary Examiner*—Robert M. Pond
(74) *Attorney, Agent, or Firm*—Sonnenschein Nath & Rosenthal LLP

(57) ABSTRACT

A system and method for providing warranties that financially guarantee one or more facts associated with an electronic transaction. In a preferred embodiment, warranties issued to the present system comprise a contract between a first party and a second party in which the first party: (1) warrants one or more warranted facts (2) for damages up to a warranted amount (3) if claimed by a relying customer within a claim period. The warranty is preferably issued by a participant in response to a request received from a customer that specifies a desired warranted amount and claim period. The participant and root entity evaluate the request in light of a plurality of factors and determine whether or not the warranty should be issued. In a preferred embodiment, the warranty comprises a contract between the buyer and its issuing participant. The seller is preferably a third-party beneficiary of this contract.

1 Claim, 19 Drawing Sheets

U.S. PATENT DOCUMENTS

| | | | | |
|---|---|---|---|---|
| 6,314,517 | B1* | 11/2001 | Moses et al. | 713/156 |
| 6,353,812 | B2* | 3/2002 | Frankel et al. | 705/44 |
| 6,658,568 | B1* | 12/2003 | Ginter et al. | 713/193 |
| 6,718,470 | B1* | 4/2004 | Adams | 726/10 |

OTHER PUBLICATIONS

"CA anticipates a secure e-commerce infrastructure," PAMATATAU, Richard. Dominion. Wellington, New Zealand: Jul. 26, 1999. p. IT.8, Proquest #43762280, 3pgs.*

"Identrus Begins Pilot, Bits Opens Doors to Lab," Corporate EFT Report. Potomac: Jul. 21, 1999. vol. 19, Iss. 14; p. 1; Proquest #43335701, 2pgs.*

"ValiCert Selected as Validation Technology for Identrus' Global Business-to-Business E-Commerce Pilot,"☐☐PR Newswire. New York: Jul. 12, 1999. p. 1; Proquest #43079343, 3pgs.*

"Will banks become E-commerce authorities?" David Hallerman. Bank Technology News. New York: Jun. 1999. vol. 12. Iss. 6; p. 1; Proquest #42664468, 8pgs.*

"ABA's Certificate Venture Aims to Give Banks the Lead in Secure Net Payments," Jeffrey Kutler. American Banker. New York, N.Y.: May 14, 1999. vol. 164, Iss. 92; p. 1; Proquest #41354786, 3pgs.*

"Baltimore Announces Support for Identrus, the Global Trust Organization," Business Wire. New York: Apr. 12, 1999. p. 1; Proquest #40459204, 3pgs.*

"Entrust Technologies Supports Newly Formed Identrus Organization," Business Editors. Business Wire. New York: Apr. 12, 1999. p. 1; Proquest #40463049, 3pgs.*

"Banks join forces to provide guarantees on internet trading," Brown-Humes, Christopher, Graham, George. Financial Times. London (UK): Apr. 12, 1999. p. 20; Proquest #40448447, 3pgs.*

* cited by examiner

| | Warranty ID | Warranty Amount & Currency Type | Alternate Amount & Currency Type | Claim Period | Expiration Date & Time | Relying Customer Name & Identifier | Subscribing Customer Name & Identifier | Issuing Participant Name & Identifier | SC Trans ID | RC Trans ID | Date & Time Stamp | Reject Reason Code & Text | Message Code |
|---|---|---|---|---|---|---|---|---|---|---|---|---|---|
| 1 | | XX | | XX | | XX | XX | | XX | XX | XX | | |
| 2 | | X | | X | | X | X | | X | X | X | | X |
| 3.1 | | X | XX(optional) | X | | | | XX | X | X | X | XX | X |
| 3.2 | | X | | | | | | | X | X | XX | | X |
| 4 | | X | X | X | | | | X | X | X | X | | X |
| 5 | | X | X | X | | | | X | X | X | X | | X |
| 6.1 | XX | X | XXXX(conditional) | X | XX | | | X | X | X | XX | X | X |
| 6.2 | | | | | | | | | X | X | XX | XX | X |
| 7.1 | X | X | X | X | X | | | X | X | X | X | | X |
| 7.2 | | | | | | | | | X | X | X | | X |
| 8.1 | X | X | X | X | X | | | X | X | X | X | | X |
| 8.2 | | | | | | | | | X | X | X | | X |
| 9.1 | X | X | X | X | X | XX | XX | X | X | X | X | | X |
| 9.2 Reject | | | | | | | | | X | X | X | X | X |
| 10.1 Wauthorizedandissued | X | X | X | X | X | X | X | X | X | X | X | | X |
| 10.2 WReject | | | | | | | | X | X | X | X | X | X |

Note:
X - The message 7.1 is signed by root entity 110 and the message 8.1 is signed by issuing participant 102 and root entity 110.
XX - Indicates data items incorporated from a prior message.
XXX - Indicates data items added/updated by the sender of the message.
If the warranty is expressed in non U.S. dollars, the alternate amount is expressed as its U.S. dollars equivalent, and the currency code is USD.

FIG. 12

| Message Element | Data Description | Restrictions |
|---|---|---|
| Warranty ID | Unique ID issued by Warranty Manager 230 R | Alphanumeric. < 128 bytes |
| Warranty Amount | Numeric. With 5 decimal places. No comma. Decimal indicator must be "." | > 500 equivalent USD |
| Currency Type | Three letter ISO currency code | Exactly 3 bytes from [A..Z] |
| Alternate Amount & Currency Type | Same as Warranty Amount and Currency Type | |
| Claim Period | Enumerated Integer | Defined by Root Entity 110 |
| Expiration Date & Time | YYYYMMDDHHMMSSZ | 24 hour clock GMT |
| Relying customer Name & Identifier | Issuer serial number and subject serial number and other optional data | < 2048 bytes |
| Subscribing Customer Name & Identifier | Issuer serial number and subject serial number and other optional data | <2048 bytes |
| Issuing Participant Name & Identifier | Issuer serial number and subject serial number other optional data | <2048 bytes |
| Date and Time (Timestamp) | YYYYMMDDHHMMSSZ | |
| Reflect Reason Code & Text | Defined by Root Entity 110 | <1024 bytes |

FIG. 13

|   |   | Warranty Id / Authorized & issued Warranty | Claim Amount & Currency Type | Claim No. | Date and Time (Timestamp) | Message Code |
|---|---|---|---|---|---|---|
|   |   |   |   |   |   |   |
| 1 | WCRequest | XX | XX |   | XX | X |
|   |   | Only WarrantyID is used henceforth |   |   |   |   |
| 2 | WCNotification | X | X | XX | XX | X |
| 2.1 | WCNotification | X | X | X | X | X |
| 2.2 | WCResponse | X | X | X | XX | X |
| 2.3 | WCResponse | X | X | X | X | X |
| 3 | WCNotification | X | X | XX | XX | X |
| 3.1 | WCNotification | X | X | X | X | X |
| 3.2 | WCAck | X | X | X | XX | X |
| 3.3 | WCAck | X | X | X | X | X |
| 4 | WCResponse | X | X | X | X | X |

Note: The messages 2 & 3 are sent concurrently
The message 4 is sent only after receiving both messages 2.3 & 3.3
X – Indicates data items incorporated from a prior message
XX – Indicates data items added/updated by the sender of the message

FIG. 14

| Message Element | Data Description | Restrictions |
|---|---|---|
| Issuing Participant Name and ID | Unique OID and Alphabetic name of Issuing Participant | Alphanumeric. < 1024 bytes |
| Validation count | Unsigned Numeric Long Integer | >0 |
| Period From/To | YYYYMMDDHHMMSSZ | |
| TimeStamp | YYYYMMDDHHMMSSZZ | |

FIG. 15

SYSTEM AND METHOD FOR PROVIDING WARRANTIES IN ELECTRONIC COMMERCE

This application is a continuation of PCT patent application serial No. PCT/US01/25388, filed Aug. 14, 2001, entitled System and Method for Providing Warranties in Electronic Commerce, which claimed priority from U.S. provisional patent application Ser. No. 60/224,994, filed Aug. 14, 2000, entitled Signing Interface Compliance Requirements, Smart Card Compliance Requirements, Warranty Service Functional Requirements, and Additional Disclosure; and U.S. provisional patent application Ser. No. 60/259,796, filed Jan. 4, 2001, entitled Warranty Manager Application Programming Interface, Warranty Messaging Specification, and Warranty Manager Functional Requirements, all three of which are hereby incorporated by reference.

COPYRIGHT NOTICE

A portion of the disclosure of this patent document contains material which is subject to copyright protection. The copyright owner has no objection to the facsimile reproduction by any of the patent document of the patent disclosure, as it appears in the Patent and Trademark Office patent file or records, but otherwise reserves all copyright rights whatsoever.

BACKGROUND OF THE INVENTION

The world of electronic commerce has created new challenges to establishing relationships between contracting parties. One of those challenges springs from the fact that the parties to the transaction cannot see or hear each other, and cannot otherwise easily confirm each other's identity and authority to act.

One remedy for this problem is to provide each contracting party with a private key for signing transmitted messages. The signing party makes available an associated public key that decrypts messages signed with the party's private key, and thus enables a receiving party to confirm the identity of the sender.

But the sender's public key may not be known a priori to the recipient. In that event, the sender may transmit with its signed message a digital certificate issued by a certification authority. The certificate is itself a signed electronic document (signed with the private key of the certification authority) certifying that a particular public key is the public key of the sender.

In some cases, the recipient may be unfamiliar with the public key of the certification authority or may not know whether the certificate is still valid. In that event, the recipient may wish to check the validity of the certificate with an entity that it trusts. In addition, the recipient may wish to obtain a financial guarantee to protect itself against damage that it may suffer from reliance on an invalid certificate.

SUMMARY OF THE INVENTION

A system and method are disclosed for providing warranties that financially guarantee one or more facts associated with a an electronic transaction. In a preferred embodiment, the warranties are provided within the context of a four-corner trust model. The four-corner model comprises a buyer, also referred to as the subscribing customer, and a seller, also referred to as the relying customer, who engage in an on-line transaction.

In a preferred embodiment, the buyer is a customer of a first financial institution, referred to as an issuing participant. The issuing participant acts as a certification authority for the buyer and issues the buyer a hardware token including a private key and a digital certificate signed by the issuing participant.

In a preferred embodiment, the seller is a customer of a second financial institution, referred to as the relying participant. The relying participant acts as a certification authority for the seller and issues the seller a hardware token including a private key and a digital certificate signed by the relying participant. The system also includes a root entity that maintains a root certification authority that issues digital certificates to the issuing and relying participants.

In a preferred embodiment, a warranty issued in the present system comprises a contract between a first party and a second party in which the first party: (1) warrants one or more warranted facts (2) for damages up to a warranted amount (3) if claimed by a relying customer within a claim period. The warranty is preferably issued by a participant in response to a request received from a customer that specifies a desired warranted amount and claim period. The participant and root entity evaluate the request in light of a plurality of factors and determine whether or not the warranty should be issued. In a preferred embodiment, the warranty comprises a contract between the buyer and its issuing participant. The seller is preferably a third-party beneficiary of this contract.

In a preferred embodiment, in order to manage the liability risks associated with issuing warranties, the root entity imposes a series of limits, called participant warranty caps, on the warranty volume that each issuing participant may have outstanding. These caps are intended to limit the aggregate level of operating risk exposure for individual participants and to limit the overall risk in the system.

If a seller suffers damage as a result of its reliance on a warranted fact, the seller may file a claim for compensation against the issuing participant. If the issuing participant determines to pay the claim, it transfers sufficient funds to the relying participant for the benefit of the seller. If the issuing participant determines to dispute the claim, the issuing participant and seller proceed to dispute resolution.

In a preferred embodiment, the root entity imposes collateral requirements on the issuing participant that may be used to pay claims for damages filed by sellers if the issuing participant is unable or unwilling to satisfy a warranty claim. The collateral is preferably held by a third-party collateral agent that is contractually obligated to pay warranty claims from the issuing participant's collateral account if ordered to do so under system operating rules.

The features and advantages described in the specification are not all inclusive, and many additional features and advantages will be apparent to one of ordinary skill in the art in view of the drawings, specification, and claims hereof.

BRIEF DESCRIPTION OF THE DRAWINGS

The above summary of the invention will be better understood when taken in conjunction with the following detailed description and accompanying drawings, in which:

FIG. 12 illustrates a preferred embodiment of data elements used to construct warranty messages;

FIG. 13 illustrates a preferred embodiment of data descriptions and restrictions for the data elements in FIG. 12;

FIG. 14 illustrates a preferred embodiment of data elements used to construct warranty claims messages; and FIG. 15 illustrates a preferred embodiment of data elements, and corresponding descriptions and restrictions, used to construct validation reporting messages.

DETAILED DESCRIPTION OF THE PREFERRED EMBODIMENTS

The present disclosure relates to a system and method for providing warranties that financially guarantee one or more facts associated with an electronic transaction. In a preferred embodiment, warranties are provided within the context of a four-corner trust model. A preferred embodiment of the four-corner model is shown in FIG. 1.

Figure 1:
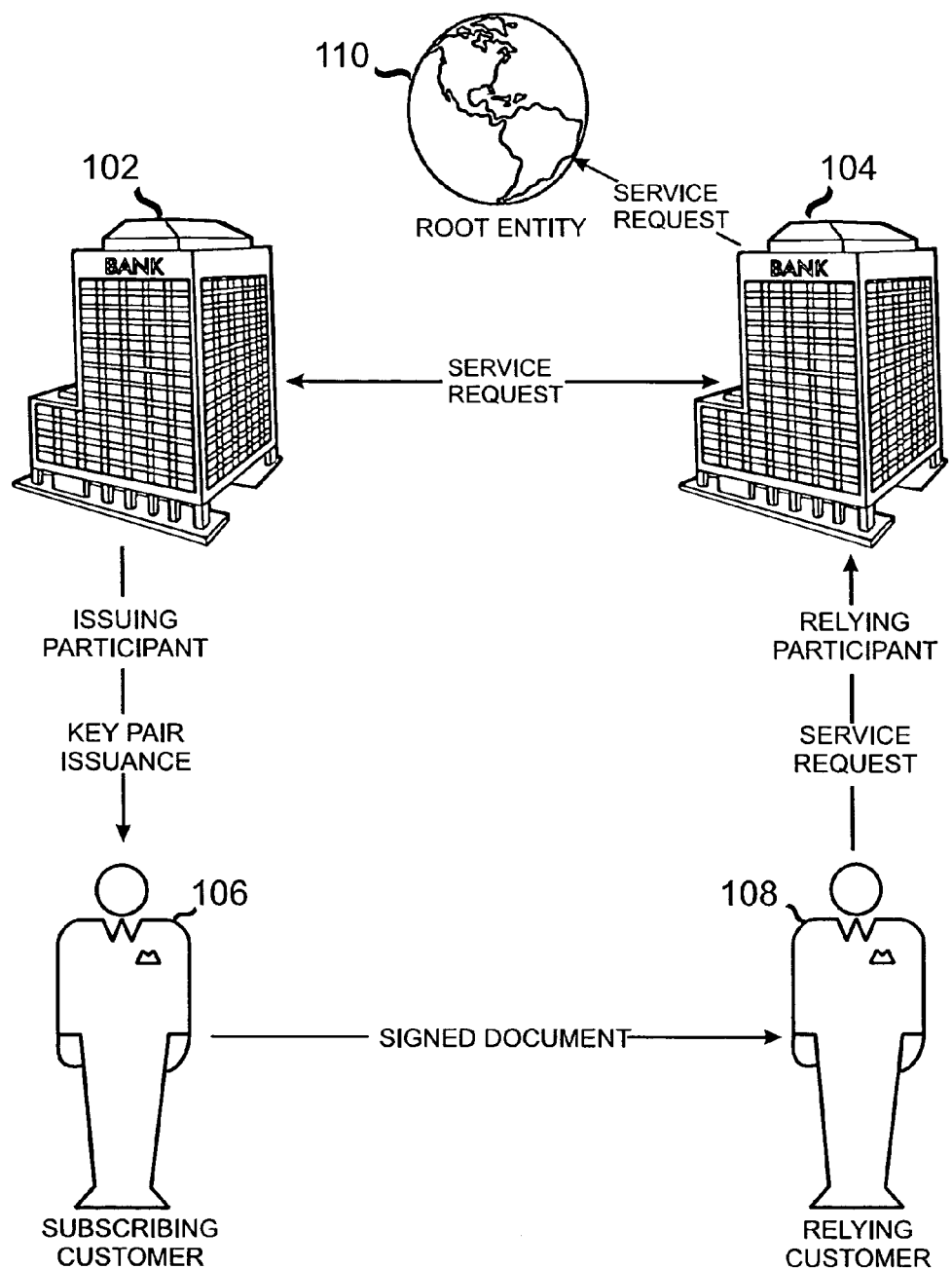
FIG. 1 is a block diagram of a preferred embodiment of a four-corner model suitable for use in the present system.

As shown in FIG. 1, the four-corner model preferably comprises a first institution 102 and a second institution 104. First institution 102 is referred to as the "issuing participant" because it is a participant in the present system and issues to its customers tokens that include a private key and a digital certificate signed by the issuing participant, as described below. Second institution 104 is referred to as the "relying participant" because it is a participant in the present system and its customers rely on representations made by issuing participant 102 and issuing participant 102's customers, as described below. Participants 102, 104 may preferably be banks or other financial institutions.

Also shown in FIG. 1 are a first customer 106 and a second customer 108. First customer 106 and second customer 108 are preferably customers of issuing participant 102 and relying participant 104, respectively. First customer 106 is referred to as the "subscribing customer" because this customer subscribes to services provided by issuing participant 102. First customer 106 is also referred to as the "buyer" because it typically fills that role in transactions with second customer 108, as described below.

Second customer 108 is referred to as the "relying customer" because it relies on representations made by both issuing participant 102 and subscribing customer 106. Second customer 108 is also referred to as the "seller" because it typically fills that role in transactions with subscribing customer 106, as described below. It should be recognized, however, that although the description below speaks primarily in terms of a buyer 106 and a seller 108, first customer 106 and second customer 108 may instead have different roles in a given transaction. For example, first customer 106 may be a borrower repaying a loan to second customer 108.

Also shown in FIG. 1 is a root entity 110. Root entity 110 is preferably an organization that establishes and enforces a common set of operating rules for facilitating electronic commerce and electronic communications. Root entity 110 may be owned jointly by a plurality of banks and/or other financial institutions that have agreed to adhere to these operating rules. One exemplary embodiment of such a root entity is described in copending U.S. application Ser. No. 09/502,450, filed Feb. 11, 2000, entitled System and Method for Providing Certification Related and Other Services and in copending U.S. application Ser. No. 09/657,623, filed Sep. 8, 2000, entitled System and Method for Providing Certificate-Related and Other Services, which are hereby incorporated by reference.

Figure 2:
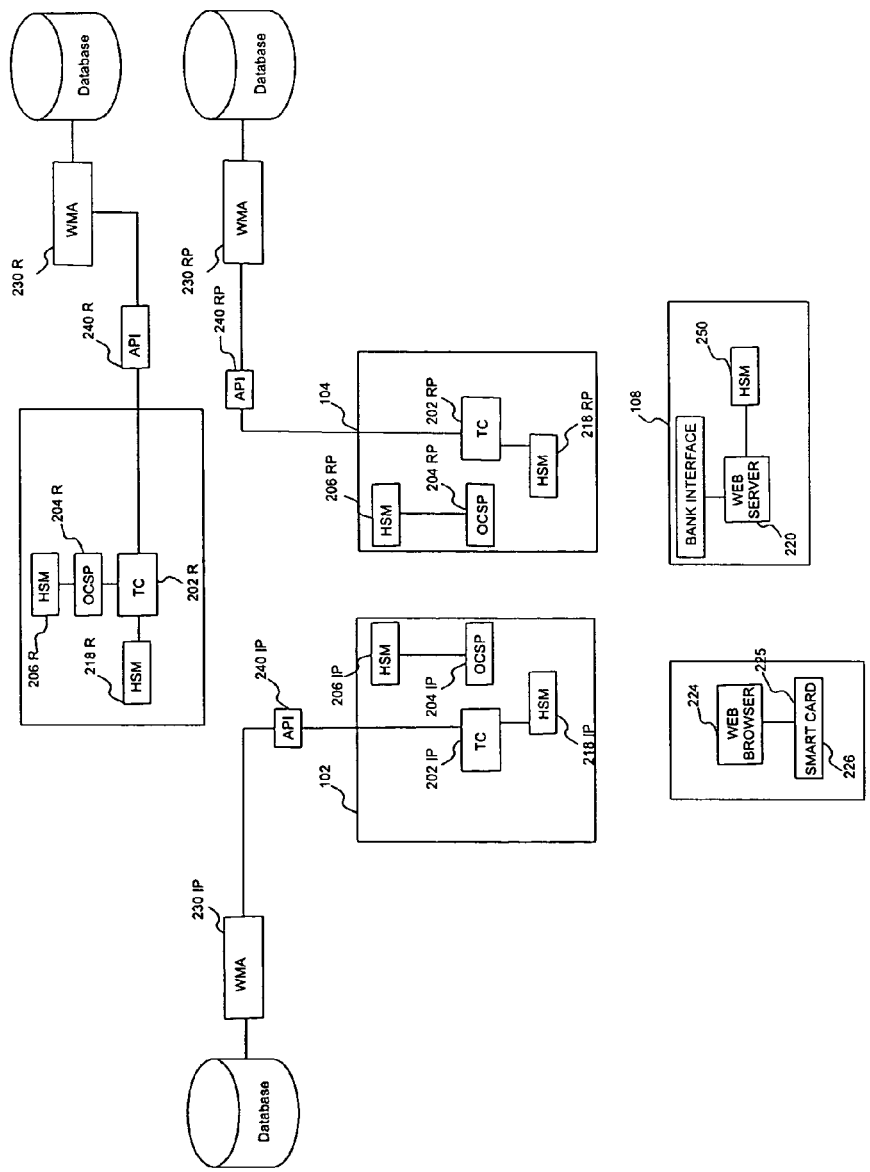
FIG. 2 is a block diagram of a preferred embodiment showing components provided at entities in the four-corner model.
Figure 3A:
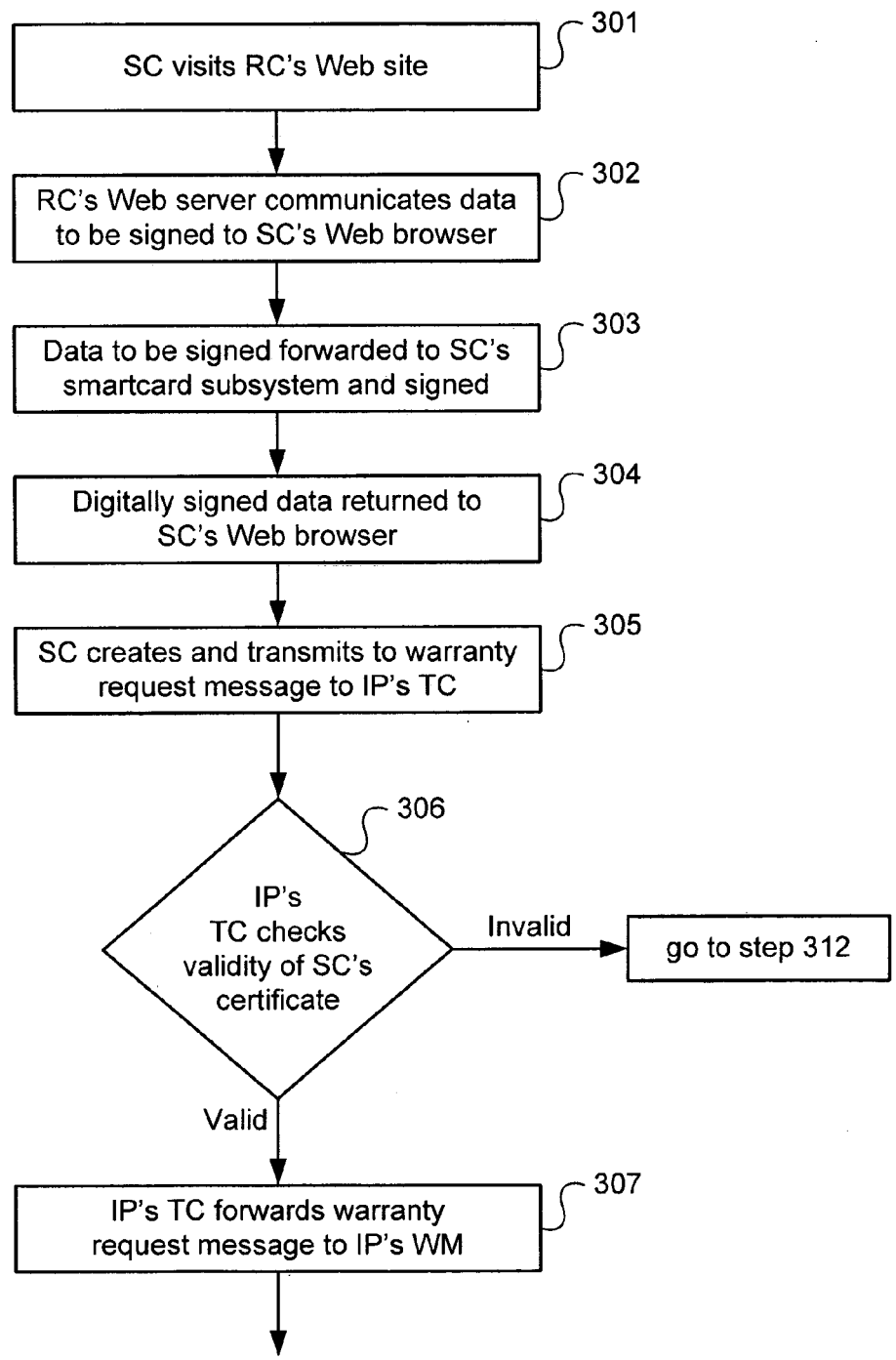
FIG. 3 illustrates a preferred embodiment of a warranty-issuance process flow.
Figure 3B:
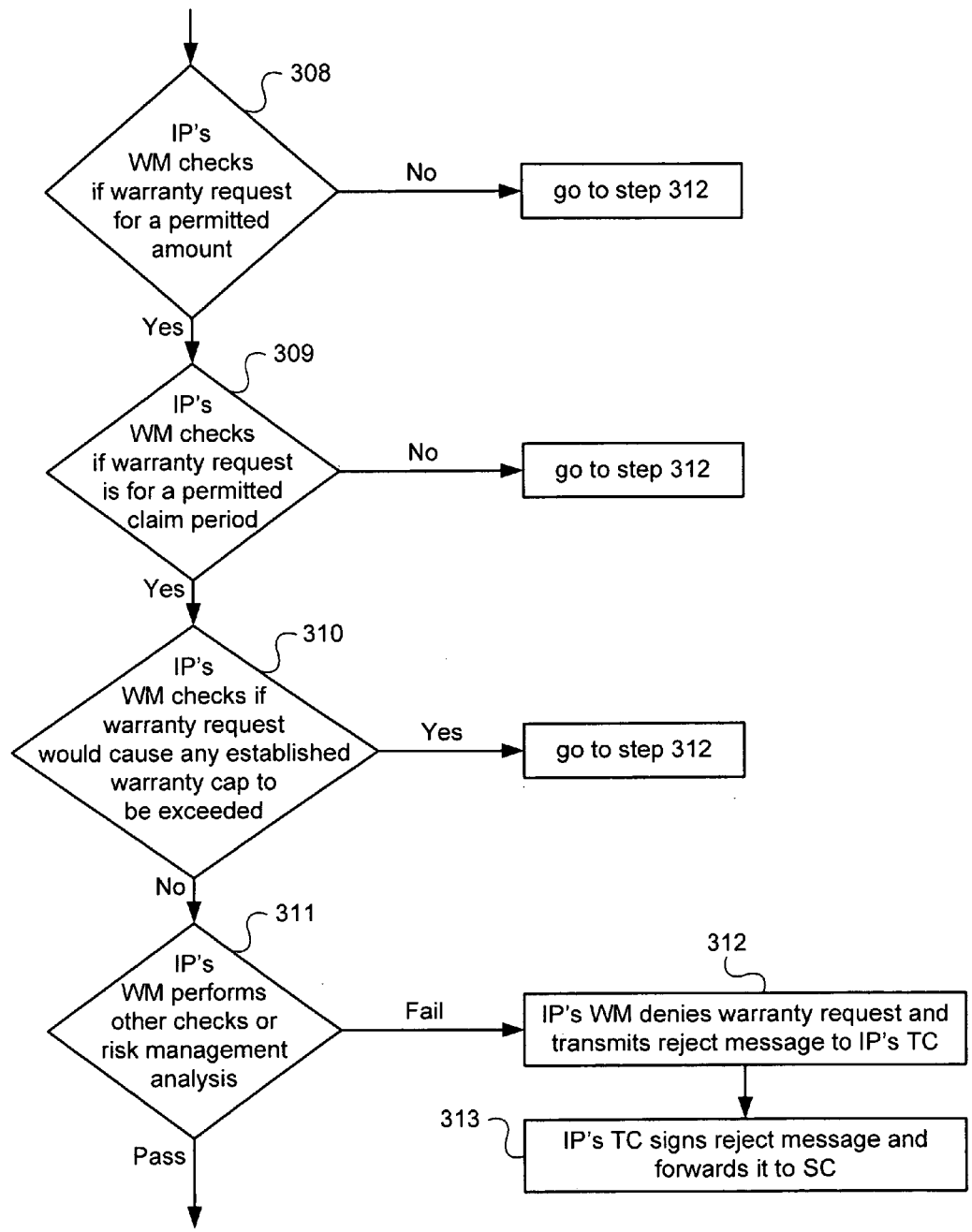
Figure 3C:
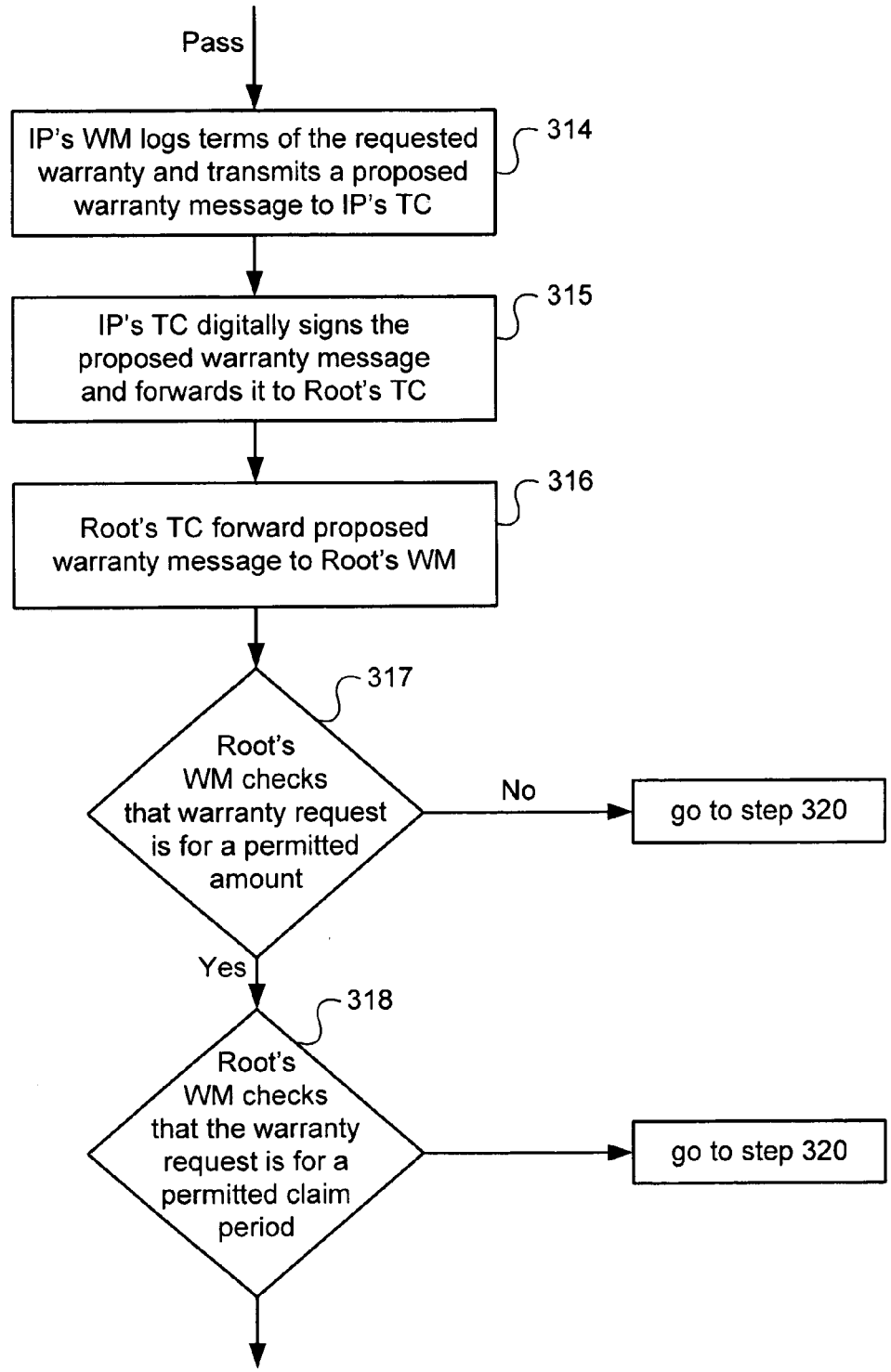
Figure 3D:
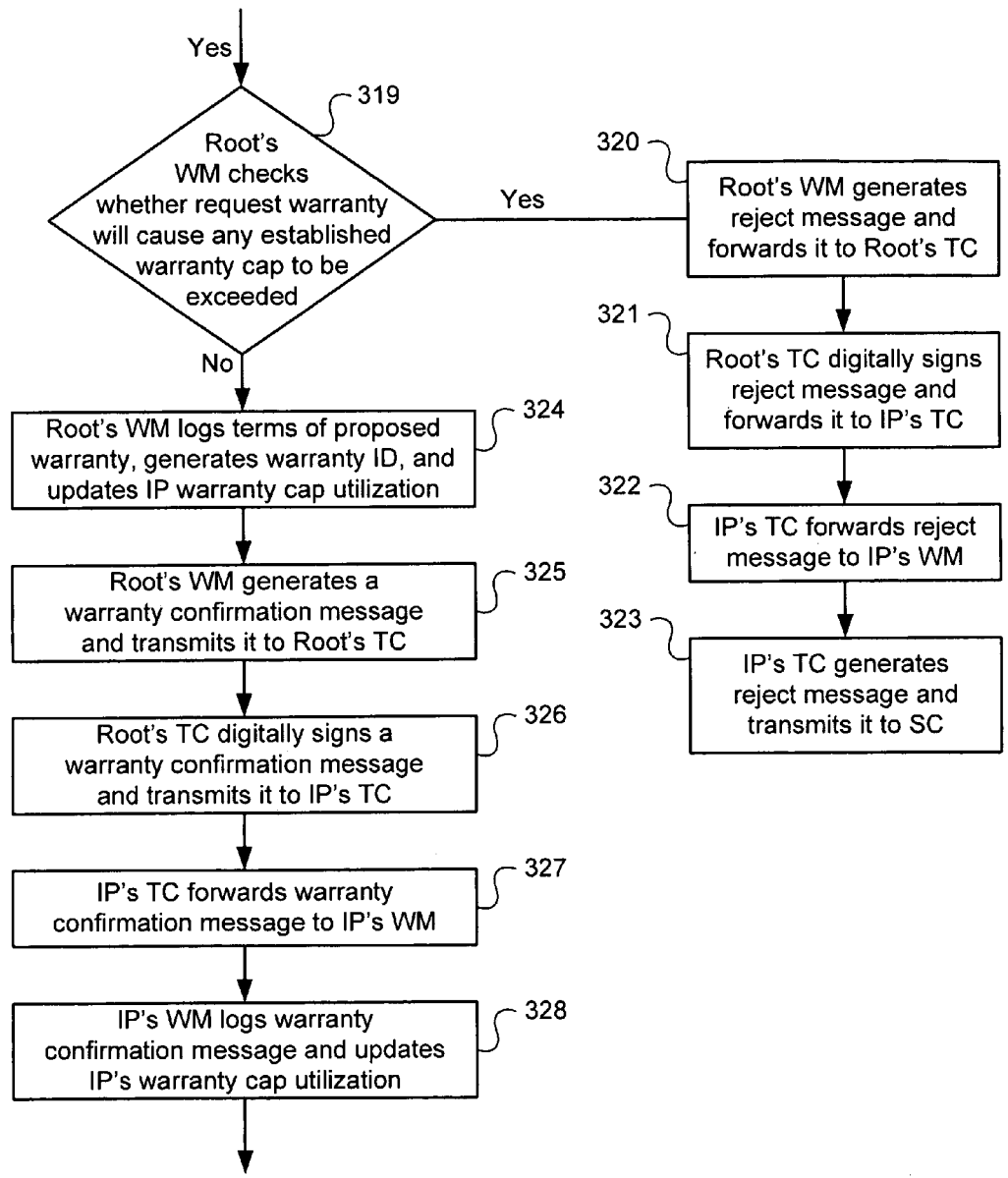
Figure 3E:
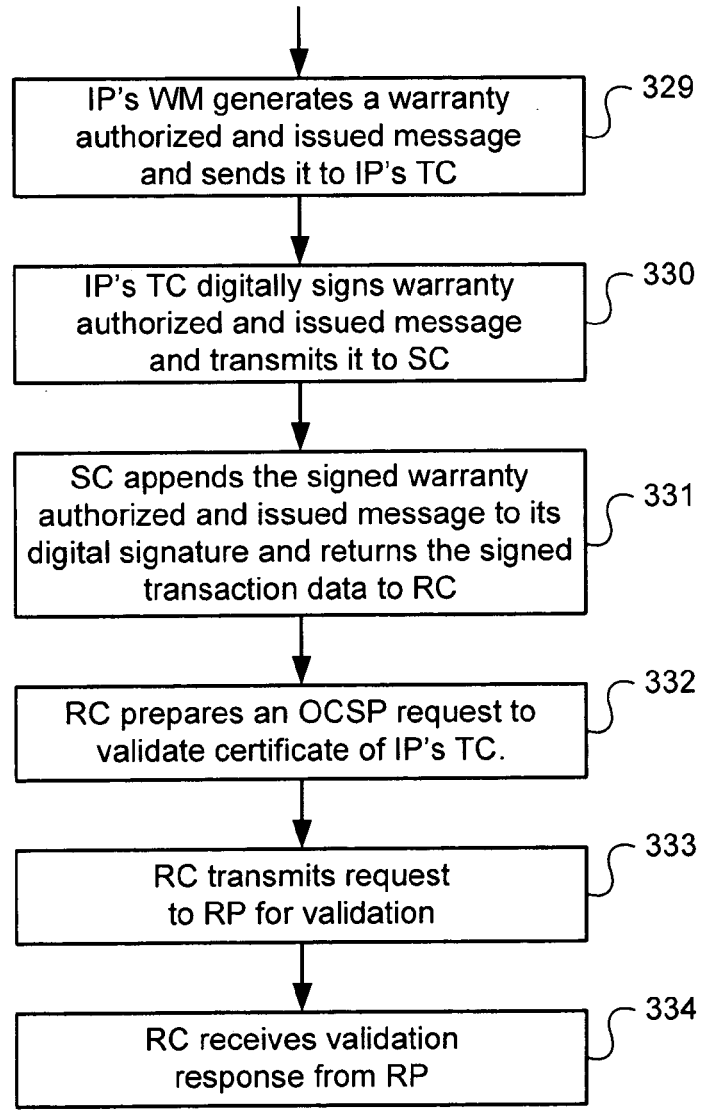

FIG. 2 illustrates components provided at each entity in a preferred embodiment of the present system. As shown in FIG. 2, participants 102, 104, and root entity 110 are each preferably provided with a transaction coordinator 202 that serves as a gateway for transmitting and receiving all inter-entity messages related to services provided by the present system. Transaction coordinators 202 provide a single interface to issuing participant 102's and relying participant 104's on-line services and implement safeguards necessary to ensure secure electronic communications between transaction coordinators 202 and other entities in the four-corner model, as described in copending U.S. patent application Ser. No. 09/657,605, filed on Sep. 8, 2000, entitled System and Method for Providing Certificate Validation and Other Services, which is hereby incorporated by reference. Each transaction coordinator 202 is preferably provided with an associated hardware security module (HSM) 218 for signing and verifying messages. Participants 102, 104, and root entity 110 are each further preferably provided with an Online Certificate Status Protocol (OCSP) responder 204 and associated HSM 206 for signing and verifying signatures on messages.

Participants 102, 104, and root entity 110 are each further preferably provided with a warranty manager 230. Warranty manager 230 is adapted to receive and transmit messages relating to warranty services and evaluate warranty requests, as described in more detail below.

As further shown in FIG. 2, relying customer 108 is preferably provided with a Web server 220 adapted to receive and transmit information via the Internet and a bank interface 222 for accessing system services. An exemplary bank interface is described in copending U.S. application Ser. No. 09/657,604, filed on Sep. 8, 2000, entitled System and Method for Facilitating Access by Sellers to Certificate-Related and Other Services, which is hereby incorporated by reference. Relying customer 108 is preferably further provided with an HSM 250 for signing and verifying signatures on messages.

As further shown in FIG. 2, subscribing customer 106 is preferably provided with a Web browser 224 adapted to receive and transmit information via the Internet. Subscribing customer 106 is also preferably provided with a smartcard subsystem 226 adapted to sign electronic messages. In a preferred embodiment, smartcard subsystem 226 may include a smartcard reader, a smartcard driver, a smartcard token, and other software, as described in U.S. provisional application Ser. No. 60/224,994, filed Aug. 14, 2000, Signing Interface Requirements, Smart Card Compliance Requirements, Warranty Service Functional Requirements, and Additional Disclosure and U.S. application Ser. No. 09/9128,999, filed Aug. 14, 2001, entitled System and Method for Secure Smartcard Issuance, which are hereby incorporated by reference. In a preferred embodiment, the smartcard token is issued to subscribing customer 106 by its issuing participant 102.

Subscribing customer 106 is also preferably provided with a signing interface 225. Signing interface 225 is adapted to invoke smartcard 226 to execute a digital signature, as described in U.S. provisional application Ser. No. 60/224,994, filed Aug. 14, 2000, entitled Signing Interface Requirements, Smart Card Compliance Requirements, Warranty Service Functional Requirements, and Additional Disclosure and U.S. application Ser. No. 09/929,035, filed Aug. 14, 2001, entitled System and Method for Facilitating Signing by Buyers in Electronic Commerce, which are hereby incorporated by reference.

In a preferred embodiment, each system entity is further preferably provided with two digital certificates (and corresponding private keys) to facilitate authentication: an identity certificate and a utility certificate.

The identity private key is used to produce digital signatures that are required by root entity 110 as evidence of an entity's contractual commitment to the contents of an electronic transaction, such as a purchase order.

The utility private key is used to provide additional transactional security. Typically, utility certificates are used to support secure socket layers (SSL), to sign secure multipurpose Internet mail extension (S/MIME) messages, and for other utility applications. Any reference in this document to the term "certificate" refers to an identity certificate unless otherwise stated.

In a preferred embodiment, root entity 110, in its capacity as a certification authority, uses a root private key to create the digital certificates of each system participant (e.g., issuing participant 102 and relying participant 104). In addition, it uses the root private key to create digital certificates for each system component maintained by root entity 110 that has digital signing capability, including OCSP responder $204_R$ and transaction coordinator $202_R$.

In addition, each system participant (e.g., issuing participant 102 and relying participant 104), in its capacity as a certification authority, uses the private key associated with its certificate from root entity 110 to create the digital certificates of its customers (e.g., subscribing customer 106 and relying customer 108). In addition, it uses this private key to create digital certificates for each system component that it maintains that has digital signing capability, including its OCSP responder 204 and transaction coordinator 202. In an alternative embodiment, the digital certificates for system components with digital signing capability that are maintained by a participant may be issued by root entity 110.

It should also be recognized that each customer 106, 108, may be a business entity, such as a corporation, that employs many individuals. In such cases, customers 106, 108 preferably authorize some or all of these individual employees to transact and utilize system services on their behalf. Issuing participant 102 preferably issues a separate smartcard token having a distinct private key and associated digital certificate to each authorized employee of subscribing customer 106. Similarly, relying participant 104 (in its capacity as "issuing participant" to relying customer 108) preferably issues a separate smartcard token having a distinct private key and associated digital certificate to each authorized employee of relying customer 108. The digital certificates preferably include the individual employee's name and identify the customer for whom he or she works. In an alternative embodiment, the private key may instead be included in a software token provided to the individual.

Although the preferred embodiment described above employs transaction coordinators at each participant 102, 104 and at root entity 110, it should be noted that, in an alternative embodiment, the system may be designed without some or all of these transaction coordinators. In this alternative embodiment, messages created, signed, or transmitted by, to, or via a transaction coordinator in the following description, may instead be created, signed, or transmitted by, to, or via a substitute system component adapted to comprise appropriate hardware and/or software to provide the desired functionality.

Warranty Products

Before describing in detail preferred embodiments for requesting and issuing warranties, an overview of the preferred warranty products provided by the present system is presented. In a preferred embodiment, a warranty issued in the present system comprises a contract between a first party and a second party in which the first party: (1) warrants one or more warranted facts (2) for damages up to a warranted amount (3) if claimed by a relying customer within a claim period.

In a preferred embodiment, the warranted facts include: (a) that a subscribing customer 106 will not repudiate a digital signature executed with an identity private key issued by its issuing participant 102; and (b) that the subscribing customer 106's certificate was valid at the time the signature was executed.

In a preferred embodiment, to repudiate a digital signature in this context means to deny that a signature is genuine. A signature is genuine in this context if it is a signature of the subscribing customer on a digital transmission made in a representative capacity by the individual named in the digital certificate associated with the private key used to sign the transmission.

In an alternative preferred embodiment, to repudiate a digital signature in this context means to deny that a signature is authorized. A signature is authorized in this context if, with respect to a digital transmission, the individual who made the digital signature of the subscribing customer on a digital transmission had actual authority to do so.

Authorized in this context does not mean that the issuance or signing of the digital transmission or the execution or performance of any underlying transaction was or is rightful or proper.

The warranted amount establishes the maximum dollar amount of recovery that a relying customer 108 may recover for damage suffered as a result of reliance on the warranty. As noted, this amount is preferably a maximum, i.e., the highest amount that relying customer 108 may recover. If the relying customer's damage is less than this maximum, then the relying customer preferably recovers only its actual damage.

The claim period is the period during which relying customer 108 must file a claim under the warranty in order to recover for any damage suffered. If no claim is filed within the claim period, the warranty expires, as described in more detail below.

In a preferred embodiment, warranties expire at 22:00 GMT regardless of the time of day the warranty issued. For example, for a warranty issued with a claim period of 14 days, 14 24-hour periods are counted from the time the warranty is issued, and the warranty expires at 22:00 GMT following that time. Thus, in this preferred embodiment, if, for example, a warranty is issued on the first of the month at 2:00 PM Eastern Daylight Time, the warranty would expire at 22:00 GMT (i.e., 6:00 PM Eastern Daylight Time) on the $15^{th}$ of the month. By contrast, in this preferred embodiment, if, for example, a warranty is issued on the first of the month at 7:00 PM Eastern Daylight Time, the warranty would expire at 22:00 GMT on the $16^{th}$ of the month.

In an alternative embodiment, warranties may expire at 21:00 GMT on the last day of the claim period regardless of the time of day the warranty issued, as described in U.S. provisional patent application Ser. No. 60/224,994, filed Aug. 14, 2000, entitled Signing Interface Compliance Requirements, Smart Card Compliance Requirements, Warranty Service Functional Requirements, and Additional Disclosure, which is hereby incorporated by reference.

In a preferred embodiment, warranties are issued by a participant in response to a request received from a customer. The request preferably specifies the desired warranty amount and claim period. The participant and root entity 110 evaluate the request in light of a plurality of factors, described in more detail below, and determine whether or not the warranty should be issued. In a preferred embodiment, the warranty is requested by a subscribing customer 106 from its issuing participant 102. In a preferred embodiment, the first party to the warranty contract is issuing participant 102 and the second party to the warranty contract is subscribing customer 106. Relying customer 108 is preferably a third-party beneficiary of the warranty contract with recourse against' issuing participant 102 for monetary compensation up to the warranted amount.

In a preferred embodiment, the operating rules establish a $500 minimum value for a warranty. In addition, issuing participant 102 may establish its own minimum value for warranties that it issues which may not be lower than that established by root entity 110. The system operating rules also preferably establish a $100,000 maximum value for a warranty. In addition, issuing participant 102 may establish its own maximum value for warranties that it issues which may not be higher than that established by root entity 110. In a preferred embodiment, the operating rules require that the claim period of a warranty be one of: 7, 14, 30, 60, 90, or 180 days.

Warranty Caps

In a preferred embodiment, in order to manage the liability risks associated with issuing warranties, root entity 110 imposes a series of limits, called participant warranty caps, on the warranty volume that each issuing participant may have outstanding. These caps are intended to limit the aggregate level of operating risk exposure for individual participants and to limit the overall risk in the system.

As used herein, the term "warranty volume" refers to the aggregate dollar amount of outstanding (i.e., unexpired) warranties issued by or for a system entity. Thus, for example, if an issuing participant has issued 500 warranties with warranted amounts of $500 each and 200 warranties with warranted amounts of $10,000 each, then the participant's warranty volume is $2.25 M. In addition, as used herein, the term "warranty cap utilization," when expressed as an amount of currency, refers to the warranty volume of an issuing participant 102. When expressed as a percentage value, the term "warranty cap utilization" refers to the participant's warranty volume divided by its warranty cap.

As described below, in a preferred embodiment, a participant's warranty volume is compared to its participant warranty cap before a warranty is issued and the warranty is not issued if the warranted amount would push the issuing participant over its cap.

A preferred embodiment for calculating a participant warranty cap for each issuing participant 102 is described below. Any reference in this document to a "warranty cap" refers to a participant warranty cap, unless otherwise specified.

In a preferred embodiment, each issuing participant 102 may also establish a customer warranty cap for each of its subscribing customers 106. A customer warranty cap limits the total warranty volume issued for a subscribing customer 106 that may be outstanding at any time, as described in more detail below.

In a preferred embodiment, each issuing participant 102 may also establish an individual warranty cap for each employee of subscribing customer 106 that is authorized to act on the customer's behalf. An individual warranty cap limits the total warranty volume issued for an authorized individual that may be outstanding at any time, as described in more detail below.

In a preferred embodiment, root entity 110 may also establish a country-specific warranty cap. This warranty cap limits the warranty volume that all participants in a given country may have outstanding at any time.

In a preferred embodiment, subscribing customer 106 may also establish warranty caps for itself and its employees that limit the warranty volume that it or its employees may have outstanding at any time. Subscribing customer 106 conveys these warranty caps to its issuing participant which enforces them in its warranty-issuance process, as described in more detail below.

Collateral

In a preferred embodiment, root entity 110 imposes collateral requirements on issuing participant 102 that may be used to pay claims for damages filed by relying customers if the issuing participant is unable or unwilling to satisfy a warranty claim. The collateral is preferably held by a third-party collateral agent that is contractually obligated to pay warranty claims from a participant's collateral account if, pursuant to dispute resolution procedures described in more detail below, the participant is ordered to pay a warranty claim but is unable or unwilling to do so. A preferred embodiment for calculating collateral requirements for each issuing participant 102 is described in more detail below.

Warranty-Issuance Process Flow

Figure 4:
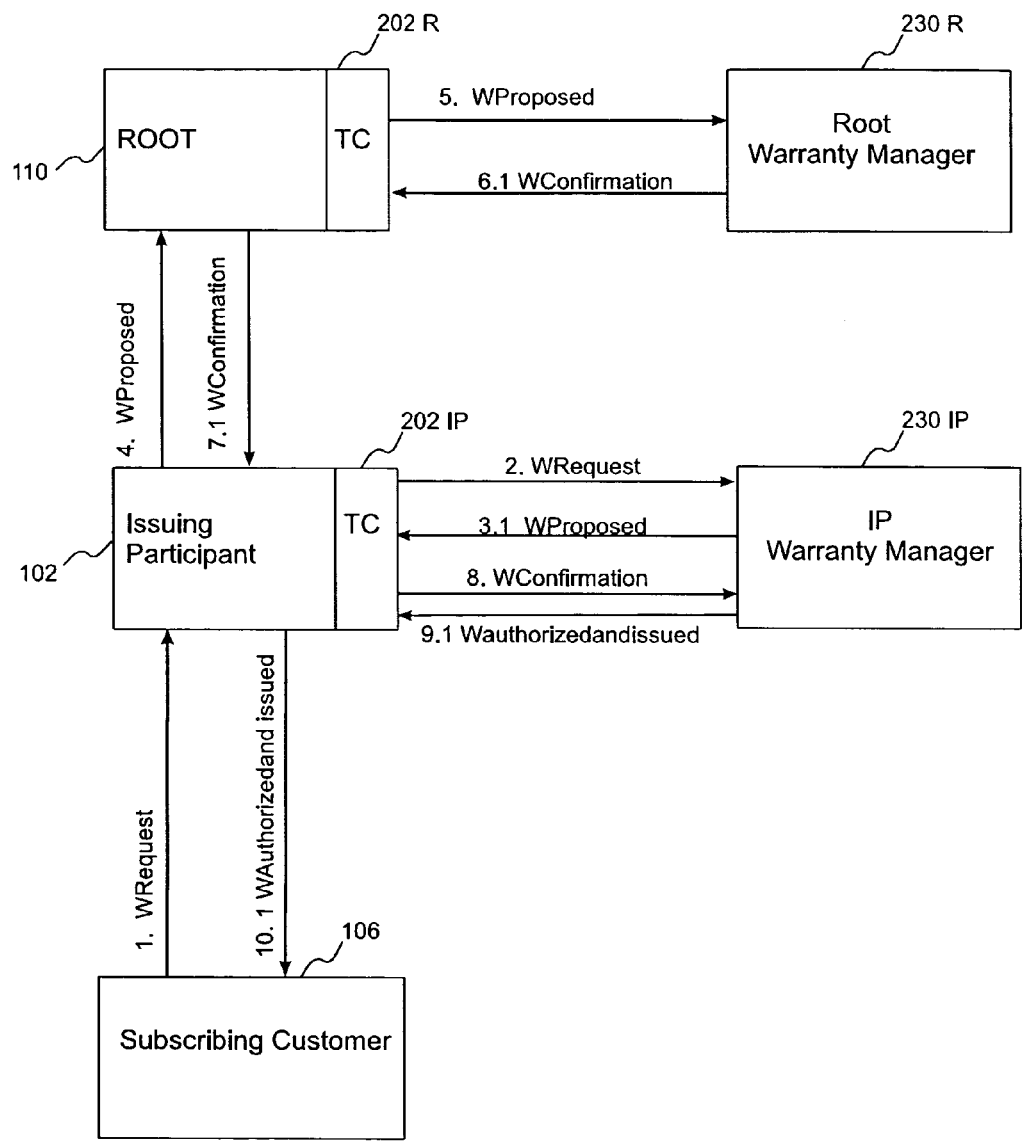
FIG. 4 illustrates a preferred embodiment of certain messages used in the preferred embodiment of FIG. 3.
Figure 5:
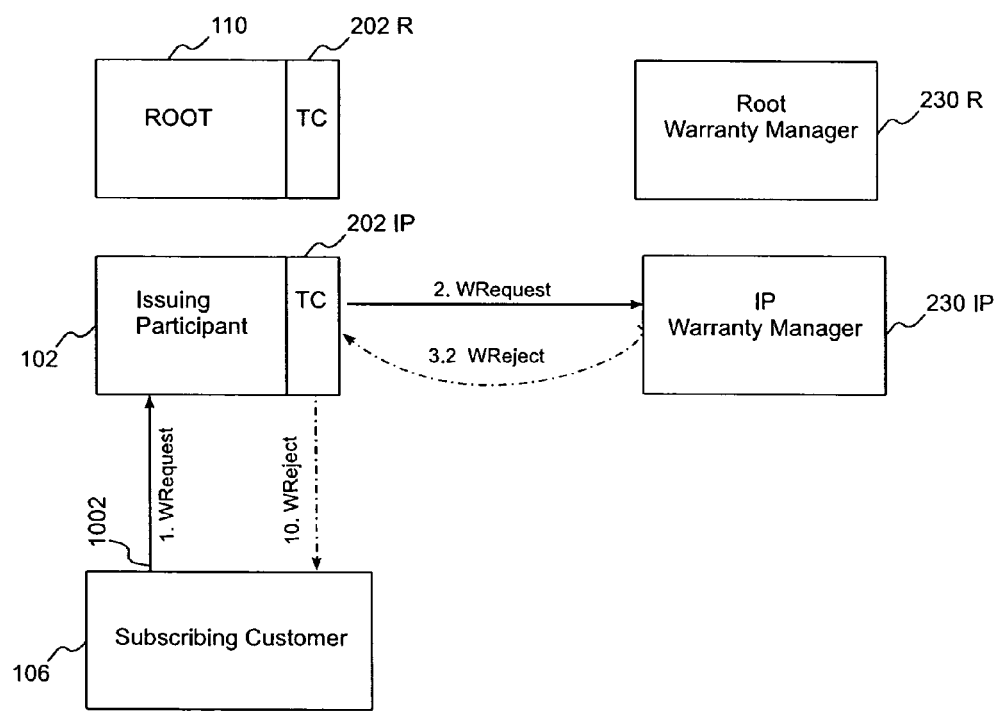
FIG. 5 illustrates a preferred embodiment of certain messages used in the preferred embodiment of FIG. 3.

A preferred embodiment of a warranty-issuance process flow is now described in connection with FIG. 3 and FIGS. 4–6. As will be recognized from the description below, FIGS. 4–6 respectively cover distinct contingencies that may occur during operation of this preferred embodiment. In particular, FIG. 4 is directed to the case where a warranty is issued; FIG. 5 is directed to the case where a warranty is rejected by issuing participant 102; and FIG. 6 is directed to the case where a warranty is rejected by root entity 110.

Figure 6:
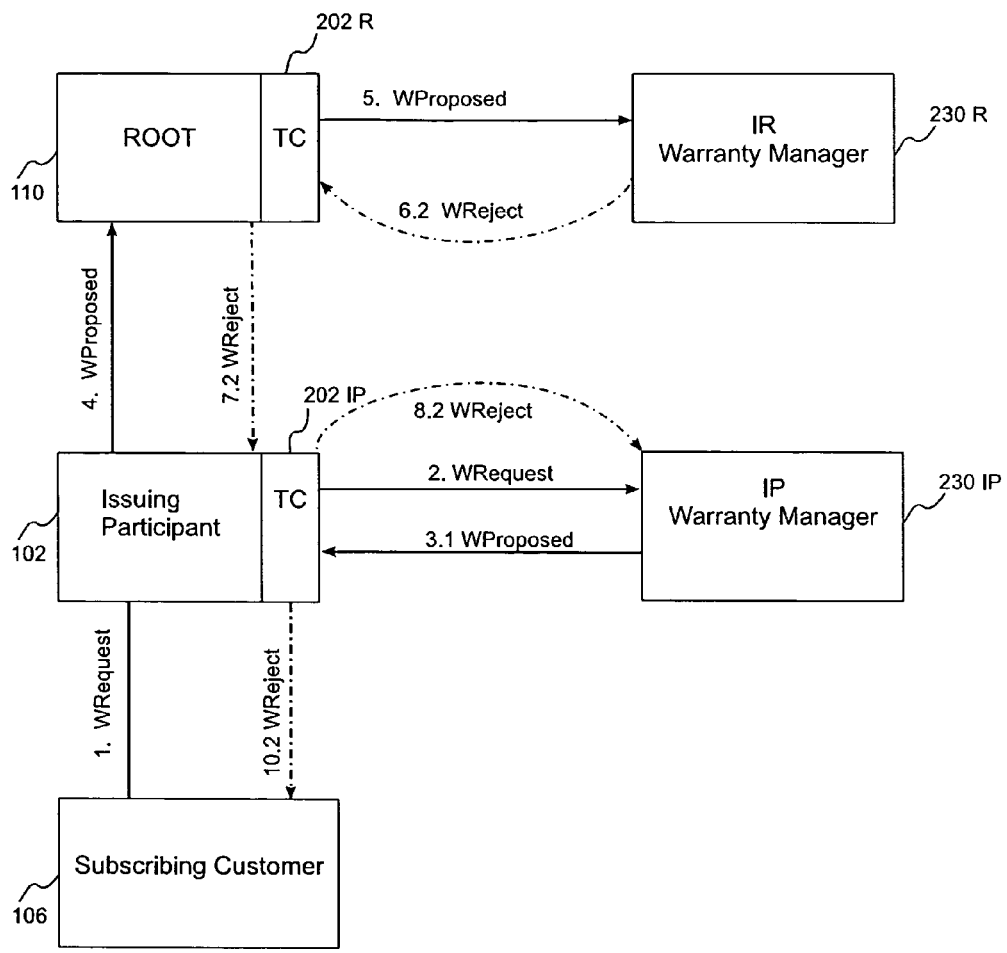
FIG. 6 illustrates a preferred embodiment of certain messages used in the preferred embodiment of FIG. 3.

Before commencing the description of this preferred embodiment, a brief overview of the messages shown in FIGS. 4–6 is presented. Preferred specifications for each of these messages are described in more detail below. As shown in FIGS. 4–6, the system utilizes the following messages in the warranty-issuance process:

(1) Wrequest: used by a customer to request a warranty;

(2) Wproposed: used by issuing participant 102 to propose a warranty to root entity 110;

(3) Wconfirmation: used by root entity 110 to indicate approval of the terms of a proposed warranty, (4) Wauthorizedandissued: used by issuing participant 102 to indicate approval of a requested warranty and to confirm warranty issuance; and (5) WReject: used by issuing participant 102 and root entity 110 to indicate rejection of a warranty request.

Turning to FIG. 3, in step 301, subscribing customer 106 visits relying customer 108's Web site. The parties preferably authenticate themselves to each other over an SSL session with their utility keys.

In step 302, Web server 220 communicates data to be digitally signed to browser 224 (e.g., a purchase order for an agreed-to transaction). In step 303, the data to be signed is forwarded to smartcard subsystem 226 which signs the data. In step 304, the executed digital signature is returned to browser 224. In a preferred embodiment, this signing process may be facilitated by using a signing interface 225 to invoke smartcard subsystem 226, as described in U.S. provisional application Ser. No. 60/224,994, filed Aug. 14, 2000, entitled Signing Interface Requirements, Smart Card Compliance Requirements, Warranty Service Functional Requirements, and Additional Disclosure, which is hereby incorporated by reference.

In step 305, software on the subscribing customer's computer creates a request for warranty and transmits the request to transaction coordinator $202_{IP}$ of issuing participant 102 (message 1 in FIGS. 4–6). In a preferred embodiment, this software may be implemented as a component of the signing interface. In an alternative embodiment, this software may be implemented as a component of smartcard subsystem 226. In yet another alternative embodiment, this software may be implemented as a plug-in to browser 224 or as a component of another suitable software program resident on the subscribing customer's computer. The warranty request is preferably digitally signed by subscribing customer 106.

Upon receipt of the request for warranty, in step 306, transaction coordinator $202_{IP}$ checks that the subscribing customer's digital certificate is valid. In a preferred embodiment, this step may be performed by validating the digital certificate with OCSP responder $204_{IP}$. If the digital certificate is not valid, processing proceeds to step 312, described below.

If the subscribing customer certificate is valid, then, in step 307, transaction coordinator $202_{IP}$ forwards the request to its warranty manager $230_{IP}$ for a determination as to whether issuing participant 102 may and/or should assume the liability associated with the warranty requested by subscribing customer 106 (message 2 in FIGS. 4–6).

Warranty manager $230_{IP}$ receives the warranty request message from transaction coordinator $202_{IP}$ and evaluates the warranty request both with respect to its internal risk management policies and with respect to the total value of warranties it has already extended. In particular, in step 308, warranty manager $230_{IP}$ checks that the warranty request is for a permitted amount (i.e., not greater than any maximum specified by issuing participant 102 or root entity 110 and not less than any minimum specified by issuing participant 102 or root entity 110). If the request is not for a permitted amount, processing proceeds to step 312, described below. In step 309, warranty manager $230_{IP}$ checks that the warranty request is for a permitted claim period (i.e., is for one of 7, 14, 30, 60, 90, or 180 days, in the preferred embodiment described above). If the request is not for a permitted claim period, processing proceeds to step 312, described below.

In step 310, warranty manager $230_{IP}$ checks that the requested warranty amount will not cause any established warranty cap to be exceeded. Thus, warranty manager $230_{IP}$ retrieves from memory the warranty cap utilization of issuing participant 102 and checks that the requested warranty amount will not cause its own participant warranty cap to be exceeded, as well as any other warranty caps (e.g., customer or individual warranty caps) established by itself or by subscribing customer 106. If the requested warranty would cause any established cap to be exceeded, then processing proceeds to step 312, described below.

In step 311, warranty manager $230_{IP}$ performs any other checks or risk management analysis put in place by issuing participant 102. For example, issuing participant 102 may implement fraud software that detects unlikely usage patterns for a digital certificate and denies a warranty when such a usage pattern is detected. If any such additional check fails or if any such analysis indicates that no warranty should be issued, processing proceeds to step 312, described below.

If one or more of the above checks fail or if any other risk management process indicates that a warranty should not be issued, then, in step 312, warranty manager $230_{IP}$ denies the requested warranty by transmitting a rejection message to transaction coordinator $202_{IP}$ (message 3.2 in FIG. 5). In step 313, transaction coordinator $202_{IP}$ digitally signs the rejection message and forwards it to subscribing customer 106 (message 10.2 in FIG. 5).

Otherwise, in step 314, warranty manager $230_{IP}$ logs the terms of the requested warranty and transmits a proposed warranty to transaction coordinator $202_{IP}$ (message 3.1 in FIGS. 4, 6). In step 315, transaction coordinator $202_{IP}$ digitally signs the proposed warranty and forwards it to transaction coordinator $202_R$ (message 4 in FIGS. 4, 6). In step 316, transaction coordinator $202_R$ forwards the proposed warranty message to warranty manager $230_R$ (message 5 in FIGS. 4, 6).

In step 317, warranty manager $230_R$ checks that the warranty request is for a permitted amount (i.e., not greater than any maximum specified by root entity 110 and not less than any minimum specified by root entity 110). If the request is not for a permitted amount, processing proceeds to step 320, described below. In step 318, warranty manager $230_R$ checks that the warranty request is for a permitted claim period (i.e., is for one of 7, 14, 30, 60, 90, or 180 days, in the preferred embodiment described above). If the request is not for a permitted claim period, processing proceeds to step 320, described below.

In step 319, warranty manager $230_R$ retrieves from memory the warranty cap utilization of issuing participant 102 and checks that the requested warranty amount will not cause issuing participant 102's participant warranty cap to be exceeded, as well as any other warranty caps that it has established (e.g., country warranty caps). If the requested warranty would cause any established cap to be exceeded, then processing proceeds to step 320, described below.

If one or more-of the above checks fail, then, in step 320, warranty manager $230_R$ denies the requested warranty by transmitting a rejection message to transaction coordinator $202_R$ (message 6.2 in FIG. 6). In step 321, transaction coordinator $202_R$ digitally signs the rejection message and forwards it to transaction coordinator $202_{IP}$ (message 7.2 in FIG. 6). In step 322, transaction coordinator $202_{IP}$ forwards the rejection message to warranty manager $230_{IP}$ (message, 8.2 in FIG. 6). In step 323, transaction coordinator $202_{IP}$ formulates a rejection message and transmits it to subscribing customer 106 (message 10.2 in FIG. 6).

Otherwise, in step 324, warranty manager $230_R$ logs the terms of the proposed warranty and generates a unique warranty identification (ID) number for the warranty. In addition, warranty manager $230_R$ updates the issuing participant's warranty cap utilization to reflect the warranted amount. In step 325, warranty manager $230_R$ generates a warranty confirmation that includes the warranty identification number and transmits it to transaction coordinator $202_R$ (message 6.1 in FIG. 4). In step 326, transaction coordinator $202_R$ digitally signs the warranty confirmation and forwards it to transaction coordinator $202_{IP}$ (message 7.1 in FIG. 4). In step 327, transaction coordinator $202_{IP}$ forwards the warranty confirmation to warranty manager $230_{IP}$ (message 8.1 in FIG. 4). In step 328, warranty manager $230_{IP}$ logs the confirmation message and updates its warranty cap utilization to reflect the warranted amount. In step 329, warranty manager $230_{IP}$ generates a warranty authorized and issued message comprising the terms of the warranty (message 9.1 in FIG. 4) and sends it to transaction coordinator $202_{IP}$. In step 330, transaction coordinator $202_{IP}$ digitally signs the warranty authorized and issued message and forwards it to subscribing customer 106 (message 10.1 in FIG. 4). In step 331, subscribing customer 106 appends the signed warranty authorized and issued message to its digital signature and returns the signed transaction data to relying customer 108.

In step 332, relying customer 108 prepares an OCSP request to validate the certificate of the system component that signed the warranty authorized and issued message (transaction coordinator $202_{IP}$ in this preferred embodiment). In step 333, relying customer 108 transmits the request to relying participant 104 for validation. The validation process may proceed in a manner analogous to that described in co-pending U.S. application Ser. No. 09/657, 605, filed Sep. 8, 2000, entitled System and Method for Providing Certificate Validation and Other Services, which is hereby incorporated by reference. In particular the OCSP request may be transmitted to OCSP responder $204_{IP}$ via transaction coordinator $202_{IP}$. OCSP responder $204_{IP}$ prepares and signs an OCSP response which is then returned to the relying participant via transaction coordinator $202_{IP}$ In a preferred embodiment, this validation request may be bundled with a validation request for subscribing customer 106's certificate and the two requests may be jointly processed.

In step 334, relying customer 108 receives the validation response from relying participant 104. If the validation is positive, relying customer 108 may be confident that the warranty is valid.

In a preferred embodiment, root entity 110 may establish as an operating rule that a warranty issued in accordance with the above-described preferred embodiment is effective as soon as it is issued and that no validation is required to render the warranty enforceable. The operating rule may also preferably specify that if, at the time the warranty was signed, an OCSP request for the certificate of the system component that signed the certificate (transaction coordinator $202_{IP}$ in this preferred embodiment, hereafter the "warranty issuer" or "issuer") would have resulted in a negative response, then the warranty is not enforceable.

As will be recognized, in this preferred embodiment, the enforceability of the warranty does not turn on whether or not relying customer 108 actually requests validation of the issuer's certificate. Nevertheless, relying customer 108 may likely wish to validate the issuer's certificate before relying on the warranty because without such validation, relying customer 108 cannot be certain that the warranty will be enforceable.

In addition to benefitting the relying customer, this validation may also facilitate business purposes important to system participants, including relying participant 104. In particular, since, as noted, relying customer 108 is typically a customer of relying participant 104, it may be desirable to provide relying customer 108 a strong motivation to continue to use services provided by relying participant 104, even in cases where a warranty issued by issuing participant 102 (of whom relying customer 108 is not necessarily a customer) is automatically enforceable without any action by relying participant 108. This preferred embodiment facilitates these business purposes because, although the issued warranty (if valid when signed) is enforceable without any action by relying customer 108, relying customer 108 will nevertheless likely choose to utilize its relying participant's validation service to validate the warranty issuer's certificate to ensure that the warranty is enforceable.

In an alternative preferred embodiment that also facilitates these business purposes, root entity 110 may establish an operating rule that a warranty issued in accordance with the above-described preferred embodiment does not go into effect until received by relying customer 108. Proof of time of receipt may be established, for example, by timestamping the received warranty with a third-party timestamping service or by validating the warranty issuer's certificate and preserving the timestamped OCSP response. The operating rule may also specify that, if between the time that the warranty was issued by issuing participant 102 and the time that the warranty was received by relying participant 108, the warranty issuer's certificate becomes invalid, then the warranty is unenforceable.

In this preferred embodiment as well, when a relying participant 108 receives a warranty from a subscribing customer 106, it cannot be certain that the warranty will be enforceable against issuing participant 102 unless it confirms after receiving the warranty that the warranty issuer's certificate remains valid. Accordingly, relying participant 108 will likely wish to validate the warranty issuer's certificate using its relying participant's validation service.

As will be recognized, in this preferred embodiment as well, the validity of the issued warranty does not turn on whether or not relying customer requests validation of the warranty issuer's certificate. In particular, if the certificate is valid, the warranty will be enforceable even if the relying customer does not confirm its valid status. Similarly, if the warranty issuer's certificate is invalid, the warranty will not be enforceable even if the relying customer does confirm its invalid status. Thus, in the former case, the warranty is enforceable when received (although the relying customer may not know this for certain without validation) and does not require any action by the relying customer to render it enforceable.

It should be recognized that although in the preferred embodiments described above, the warranty issuer is transaction coordinator $202_{IP}$, the warranty issuer may alternatively be some other component with signing capability maintained by issuing participant 102. For example, if warranty manager $230_{IP}$ is provided with digital signing capability (e.g., an HSM), then warranty manager $230_{IP}$ may itself sign all warranty messages created by issuing participant 102. Alternatively, another system component with signing capability may be designated to sign all warranty messages created by issuing participant 102.

In addition, as noted above, although the preferred embodiments described above employ transaction coordinators at each participant 102, 104 and at root entity 110, it should be noted that, in an alternative embodiment, the system may be designed without some or all of these transaction coordinators. In this alternative embodiment, messages created, signed, or transmitted by, to, or via a transaction coordinator in the following description, may instead be created, signed, or transmitted by, to, or via a substitute system component adapted to comprise appropriate hardware and/or software to provide the desired functionality. Thus, for example, the system may be designed so that OCSP requests from a relying customer 108 are transmitted directly to OCSP responder $204_{IP}$ by the customer's relying participant 104, and warranty. messages to or from an issuing participant 102 are transmitted directly to or from that participant's warranty manager $230_{IP}$.

Warranty Claim Procedure

In a preferred embodiment, relying customer 108, as a third-party beneficiary, may bring a claim against an issuing participant 102 if a warranted fact in a warranty issued by the participant is incorrect, and the relying customer suffers damage as a result of its reliance on the warranted fact. A preferred embodiment of a process for filing and resolving warranty claims is now described in connection with FIG. 7 and FIG. 8.

Figure 8:
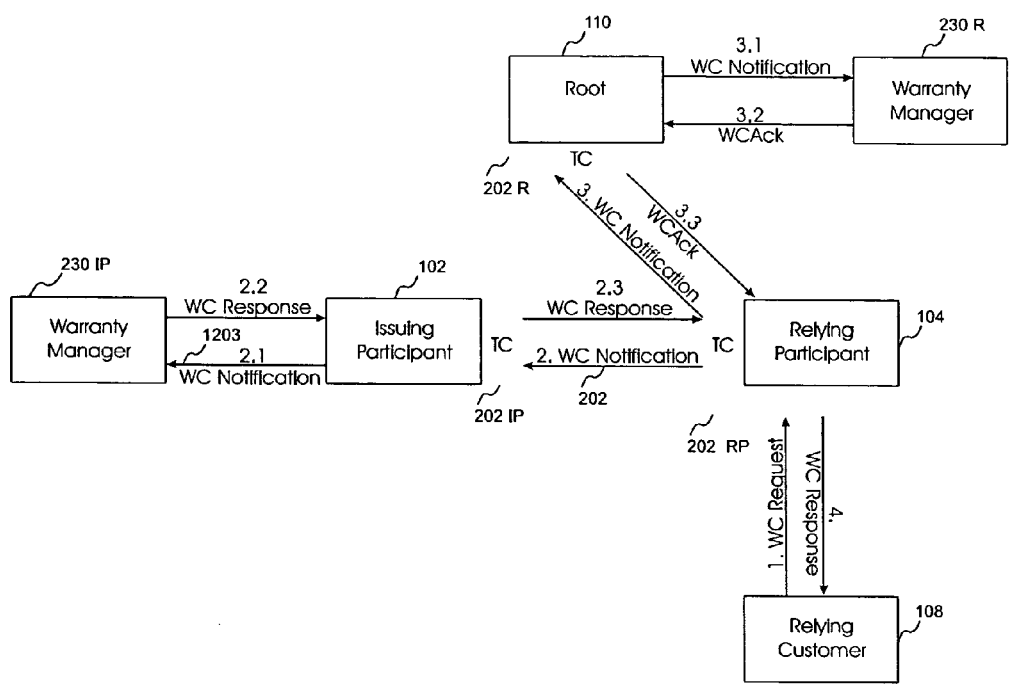
FIG. 8 illustrates a preferred embodiment of certain messages used in the preferred embodiment of FIG. 7.

Before commencing description of this preferred embodiment, a brief overview of the messages shown in FIG. 8 is presented. Preferred specifications for each of these messages are described in more detail below. As shown in FIG. 8, the system utilizes the following messages in the warranty-claim process:

(1) WCRequest: used by a relying customer 108 to file a claim against a warranty;
(2) WCNotification: used by a relying participant 104 to notify an issuing participant 102 and root entity 110 of a filed claim;
(3) WCResponse: used by an issuing participant 102 to acknowledge receipt of a filed claim;
(4) WCAck: used by root entity 110 to acknowledge receipt and processing of a filed claim.

Figure 7A:
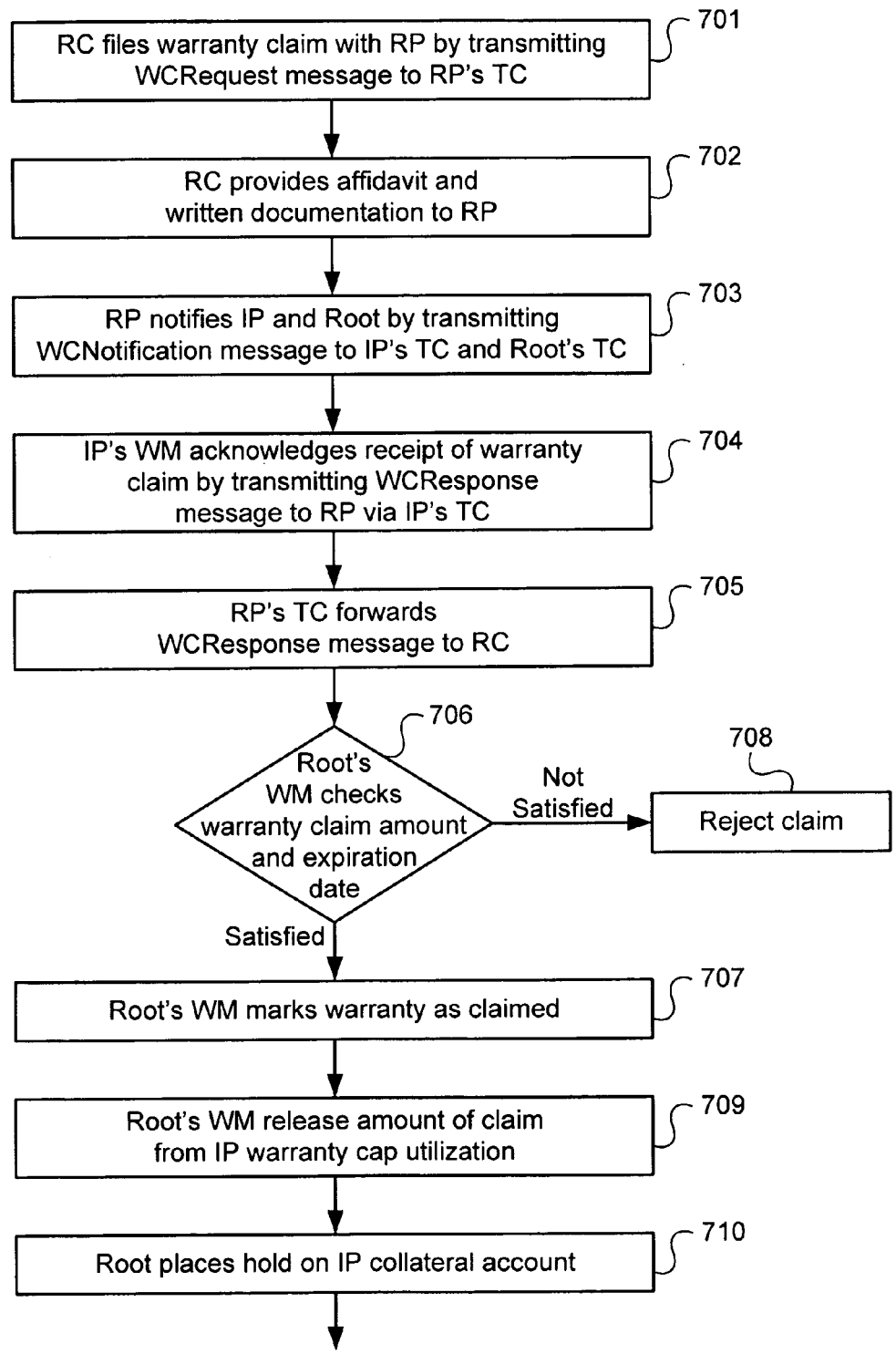
FIG. 7 illustrates a preferred embodiment of a warranty-claim process flow.
Figure 7B:
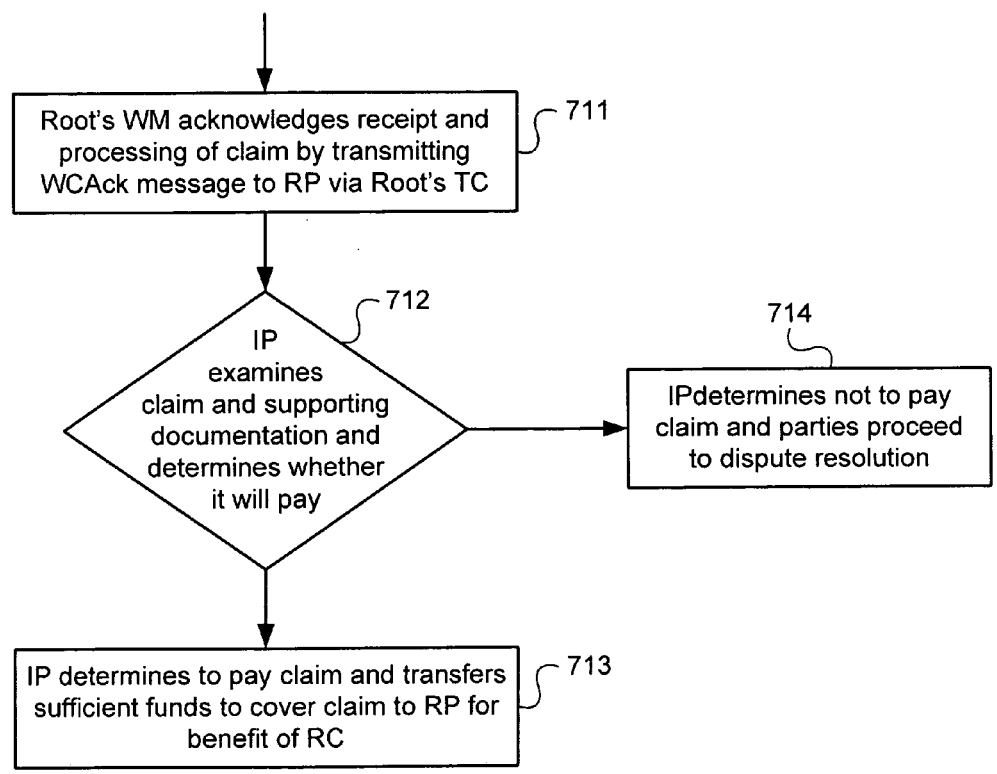

As shown in FIG. 7, in step 701, relying customer 108 files a warranty claim with relying participant 104 by transmitting a WCRequest message to transaction coordinator $202_{RP}$ of relying participant 104 (message 1 in FIG. 8). Relying customer 108's claim must preferably include the terms of the warranty (as specified in the warranty-authorized-and-issued message), the date of the claim, and the warranty claim amount.

In step 702, relying customer 108 provides relying participant 104 with an affidavit certified by a duly authorized person on behalf of relying customer 108 that includes complete and detailed supporting documentation certifying the amount of damages claimed by relying customer 108. Relying customer 108 also provides relying participant 104, to the extent available, written documentation from subscribing customer 106 identifying the particular warranted fact that is alleged to be incorrect. For example, the written documentation from subscribing customer 106 may include a statement denying that it authorized a particular digital signature or acknowledging that its certificate was not valid at the time of the transaction. In a preferred embodiment, the documentation submitted in this step must be submitted within 14 days of the warranty-claim filing.

In an alternative embodiment, relying customer 108 may submit its claim and supporting documentation directly to issuing participant 102. In this embodiment, the warranty-authorized-and-issued message preferably comprises information to aid relying customer 108 in filing its claim. This information may include a uniform resource locator (URL) that identifies a Web page that contains further claim-processing information and a mailing address for submitting supporting documentation. If relying customer 108 files its claim directly with issuing participant 102, then it preferably provides relying participant 104 with copies of the documentation it files.

In step 703, relying participant 104 notifies issuing participant 102 and root entity 110 of the filed claim by transmitting a WCNotification message to transaction coordinator $202_{IP}$ of issuing participant 102 and transaction coordinator $202_R$ of root entity 110 (messages 2, 3 in FIG. 8). Transaction coordinators $202_{IP}$, $202_R$ forward the notifications to their respective warranty managers $230_{IP}$, $230_R$ (messages 2.1, 3.1 in FIG. 8). In a preferred embodiment, these notifications must be made within twenty-four hours of the time relying participant 104 receives information regarding the filed claim. The notification preferably includes the warranty ID for the warranty that is the subject of the warranty and the warranty claim amount.

In step 704, warranty manager $230_{IP}$ of issuing participant 102 acknowledges receipt of the warranty claim by transmitting a WCResponse message to relying participant 104 via transaction coordinator $202_{IP}$ (messages 2.2, 2.3 in FIG. 8). In step 705, transaction coordinator $202_R$ of relying participant 104 forwards the message to relying customer 108 (message 4 in FIG. 8).

In step 706, warranty manager $230_R$ of root entity 110 checks the warranty-claim amount to confirm that it is not greater than the warranted amount and that the date of the claim precedes the warranty expiration date. If both of these conditions are satisfied, then warranty manager $230_R$ marks the warranty as "claimed" (step 707). Otherwise, the warranty claim is rejected (step 708). In step 709, warranty manager $230_R$ releases the amount of the claim from issuing participant 102's warranty cap utilization. In a preferred embodiment, this release is performed 48 hours after a warranty is designated as "claimed."

In a preferred embodiment, if a claim is filed for less than the full amount of the warranty, then the unclaimed amount is treated as still utilized under an issuing participant's warranty cap. For example, if issuing participant 102 issues a warranty for $500,000 and a claim is filed for $200,000, then $200,000 is released from issuing participant 102's warranty cap utilization, thus becoming available for writing additional warranties. The remaining $300,000 continues be considered as utilized warranty cap, and is not released until the warranty expiration date. If during the warranty claim period, claims for additional losses are made against the remaining amount of the warranty, then the amount of those additional claims may at that time be released from issuing participant 102's warranty cap utilization.

In step 710, root entity places a hold on issuing participant 102's collateral account for the claimed amount to cover the claim in the event issuing participant 102 defaults. In step 711, warranty manager $230_R$ of root entity 110 acknowledges receipt and processing of the warranty claim by transmitting a WCAck message to relying participant 104 via transaction coordinator $202_R$ (messages 3.2, 3.3 in FIG. 8).

In step 712, issuing participant 102 examines the claim and any supporting documentation and determines whether it will pay the claim. If issuing participant 102 determines to pay the claim, then, in step 713, issuing participant 102 transfers sufficient funds to cover the amount of the claim to relying participant 104 for the benefit of relying customer 108. Relying participant 104 preferably notifies root entity 110 via a daily reporting procedure established by root entity 110 once relying participant 104 has received these funds. Once root entity 110 receives this notification, warranty manager $230_R$ releases the hold on issuing participant 102's collateral account for the amount of claim paid.

If issuing participant 102 determines not to pay the claim, then, in step 714, issuing participant 102 and relying customer 108 proceed to dispute resolution to resolve the claim. An exemplary set of dispute resolution procedures is set forth in U.S. provisional application Ser. No. 60/153,443, filed Sep. 10, 1999, entitled System and Process for Certification in Electronic Commerce, converted into co-pending U.S. patent application Ser. No. 09/657,623, filed Sep. 8, 2000, entitled System and Method for Providing Certificate-Related and Other Services, both of which are hereby incorporated by reference. Root entity 110 preferably does not release collateral held to secure a disputed warranty claim until the dispute is successfully resolved.

The claims procedure described above is further described in U.S. provisional application Ser. No. 60/153,443, filed Sep. 10, 1999, entitled System and Process for Certification in Electronic Commerce, converted into co-pending U.S. patent application Ser. No. 09/657,623, filed Sep. 8, 2000, entitled System and Method for Providing Certificate-Related and Other Services, both of which are hereby incorporated by reference.

Warranty Cap Calculation and Daily Processing

As noted, in a preferred embodiment, root entity 110 imposes a warranty cap on each issuing participant 102 that limits the warranty volume the participant may have outstanding at any point in time. These caps are intended to control the aggregate level of operating risk exposure for individual participants and to control the overall risk in the system.

In a preferred embodiment, warranty manager $230_R$ of root entity 110 is tasked with establishing each issuing participant's warranty cap and adjusting the cap as appropriate. Warranty manager $230_R$ preferably takes into account a plurality of factors in calculating a participant warranty cap, including the participant's total capital, operating loss factor, and credit rating. The credit rating is preferably quantified as a credit discount factor so that it may be incorporated in the warranty-cap calculation, as described below. In addition, as noted below, a participant may raise its warranty cap by submitting credit-based collateral to a collateral agent to cover potential warranty claims.

One preferred embodiment for calculating a participant warranty cap is:

Participant Warranty Cap=(Total Capital*(1/Operating Loss Factor)*Credit Discount Factor)+(Credit-Based Collateral)

In a preferred embodiment, total capital represents the capital level of the legal entity under which a participant's certification authority operates (i.e., the entity that signs customer certificates). For example, if a participant operates its certification authority under an operating subsidiary, then the capital level of the subsidiary is used to determine the participant warranty cap. But if the issuing participant operates its certification authority as part of its main financial services entity, then the total capital of that entity is used to determine the participant warranty cap.

The operating loss factor preferably represents the historical operating loss of the issuing participant for operations within the present system. As will be recognized, when a participant first commences operation in the present system, it cannot immediately be assigned an actual operating loss factor, since there is no historical data from which to calculate it. Accordingly, in a preferred embodiment, all participants are initially assigned an estimated operating loss factor of 0.6% derived in the chart below.

| Measure | Op Loss Factor as % of Assets | Source |
|---|---|---|
| Bank Operating Loss | 16–25 bps | First Manhattan estimates based on historical operating experience in processing business (1993–94) |
| Mutual Fund Operating Losses | 40–50 bps | First Manhattan estimates; Mutual Fund industry reports on reporting and processing anomalies (1993–94) |
| Average | 30 bps | |
| Conservative Add-on | 2x | Estimates |
| Initial Operating Loss Factor | 60 bps | |

Over time, the operating loss factor is preferably adjusted as actual operating loss data becomes available. In a preferred embodiment, a participant's operating loss factor is adjusted annually to reflect the participant's actual operating loss for the most recent year.

As noted, each participant's credit rating is preferably translated into a credit discount factor. An exemplary set of credit ratings and associated discount factors are set forth below:

| Rating | Discount Factor |
|---|---|
| AAA (−◊+) | 1.0 |
| AA (−◊+) | 1.0 |
| A (−◊+) | 0.9 |
| BBB+ | 0.8 |
| <BBB+ | not eligible without explicit collateralization of operations (credit-based collateral) |

An exemplary calculation of a participant warranty cap is illustrated below.

| Component | (Millions) |
|---|---|
| Capital | $2,000 |
| Operating Loss Rate | 0.60% |
| Credit Rating (Discount Factor) | AA (1.0) |
| Total Warranty Cap | $333,333 |

In a preferred embodiment, root entity 110 may initially establish a participant warranty cap of $50,000,000 for each participant when the system is first established. The above warranty-cap formula may then preferably be phased in as system entities gain operational experience.

Once a warranty cap is set for a particular participant, the participant's warranty volume may not exceed the cap. As noted, warranty manager 230$_R$ preferably tracks each issuing participant's warranty cap utilization and checks each time a warranty is proposed to ensure that the participant's cap will not be exceeded. In addition, warranty manager 230$_R$ may check an issuing participant's warranty cap utilization against its participant warranty cap at predetermined intervals, such as daily. If a participant exceeds its warranty cap, then root entity 110 may take reasonable steps to address the situation, including but not limited to, fining the participant or suspending its certificate.

In a preferred embodiment, warranty manager 230$_R$ is adapted to report to participants their warranty cap utilization and outstanding warranty claims on a regular basis. The reporting frequency may preferably be a function of the percentage of a participant's warranty cap that is currently being utilized One preferred embodiment of a reporting schedule is as follows:

| Position at beginning of Period (i.e., Daily) | Reporting Frequency |
|---|---|
| Less than 80% of Warranty Cap | Daily |
| 80–90% of Cap | 4 hours |
| Greater than 90% of Cap | Real Time |

Collateral Requirement Calculation and Daily Processing

As noted, in a preferred embodiment, root entity 110 imposes collateral requirements on each issuing participant 102 that may be used to pay claims for damages filed by relying customers if the issuing participant is unable or unwilling to satisfy such claims. Although the amount of required collateral need not be adequate to ensure full coverage of all outstanding warranties, the collateral amount is preferably adequate to materially increase the probability of a relying customer's recovery on a warranty claim in the event that an issuing participant is unable or unwilling to honor such a claim.

In a preferred embodiment, the total collateral amount posted by an issuing participant 102 is made up of two components: performance-based collateral and credit-based collateral. In a preferred embodiment, the performance-based collateral requirement for an issuing participant 102 may be calculated as follows:

Performance-Based Collateral Requirement=[Warranty Volume Outstanding*Operating Loss Factor]+[Aggregate Amount of Outstanding Unpaid Warranty Claims]

All system participants are preferably required to post performance-based collateral.

Credit-based collateral is collateral that an issuing participant chooses to post in order to increase its warranty cap. If a participant elects to post credit-based collateral, then it is preferably required to maintain the credit-based collateral until it changes its election and its warranty cap no longer includes the credit-based collateral.

An exemplary calculation of the required collateral amount for an issuing participant 102 is illustrated below. For purposes of this example, it is assumed that issuing participant 102 has $500 million in issued warranties, an operating loss factor of 0.6%, and outstanding warranty claims of $200,000. As such, issuing participant 102 must maintain in this preferred embodiment a minimum of $3.2 million in performance-based collateral for the benefit of relying customers in the event of default on a warranty claim. As further assumed in the example below, if issuing participant 102 wishes to post an additional $2 million in credit-based collateral to increase its warranty cap, then its total required collateral amount would be $5.2 million.

| Component | | $ (millions) |
|---|---|---|
| (a) Outstanding Claims (100%) | | $.20 |
| (b) Warranties Issued | $500 | |
| (c) Operating Loss Rate | 0.60% | |
| (d) Projected Claims Rate (b*c) | | $3.00 |
| Performance-Based Collateral (a + d) | | $3.20 |
| Credit-Based Collateral | | $2.00 |
| Total Required Collateral | | $5.20 |

In a preferred embodiment, root entity 110 designates the types of collateral (called eligible collateral) that may be posted by participants in satisfaction of the collateral requirements described above. In one preferred embodiment, the only eligible collateral are U.S. dollars and direct obligations of the U.S. government (e.g., U.S. treasury securities). In other preferred embodiments, root entity 110 may establish additional types of eligible collateral.

In a preferred embodiment, each issuing participant selects its own collateral agent for purposes of administering collateral that it must post. Each issuing participant preferably establishes a collateral account with its collateral agent specifically for the collateral posted in satisfaction of these collateral requirements. Preferably, credit-based collateral is held in a separate account than performance-based collateral.

In a preferred embodiment, the collateral agent is subject to a contractual obligation under which it may be directed to pay a warranty claim from a participant's collateral account if that participant refuses to pay the claim. Payment may preferably be directed from both credit-based collateral and performance-based collateral to satisfy a claim.

In a preferred embodiment, root entity 110 updates each issuing participant's collateral requirements and monitors the participant for compliance with those requirements on a regular basis, preferably daily. A preferred updating and monitoring process is now described in connection with FIG. 9.

Figure 9:
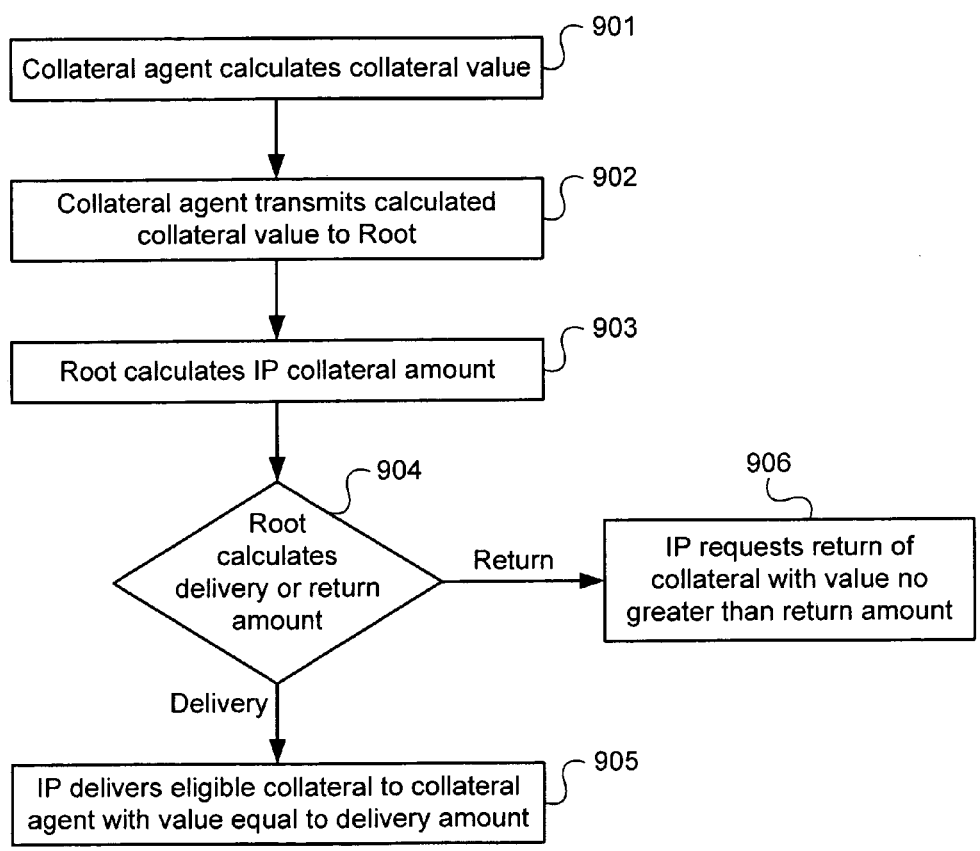
FIG. 9 illustrates a preferred embodiment of a process for collateral updating and monitoring.

As shown in FIG. 9, in step 901, the collateral agent calculates a value for the collateral posted with it by issuing participant 102. In performing this calculation, the collateral agent preferably uses reliable pricing sources to obtain closing market prices of each security included in the collateral. In a preferred embodiment, the collateral value is calculated as the sum of the market values of each security included in the collateral multiplied by a haircut for that security preferably determined by root entity 110. Any collateral that is not eligible collateral is preferably assigned a market value of zero in this valuation.

In step 902, the collateral agent transmits the calculated collateral value to root entity 110. In step 903, root entity 110 calculates the issuing participant's required collateral amount.

In step 904, root entity 110 calculates a delivery amount or return amount for the issuing participant and notifies the issuing participant of its required collateral amount and this delivery amount or return amount. A delivery amount is the amount, if any, by which the required collateral amount exceeds the collateral value. A return amount is the amount, if any, by which the collateral value exceeds the required collateral amount.

If root entity 110 notifies the participant of a delivery amount, then, in step 905, the issuing participant must deliver eligible collateral with a collateral value at least equal to that delivery amount to its collateral agent. Failure to satisfy this requirement within one business day is grounds for suspension of the participant. Otherwise, if root entity 110 notifies the participant of a return amount, then, in step 906, the participant may elect to request the return of collateral with a collateral value no greater than the return amount from its collateral agent.

Warranty Manager Implementation

Figure 10:
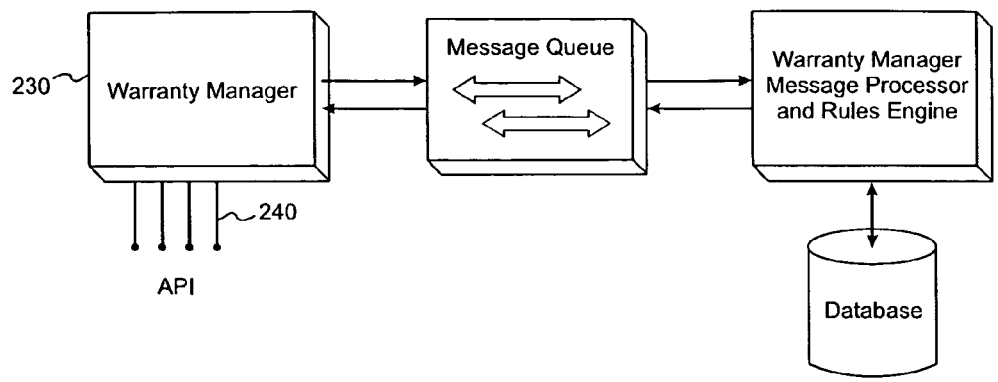
FIG. 10 illustrates a preferred embodiment for implementing a warranty manager.
Figure 11:
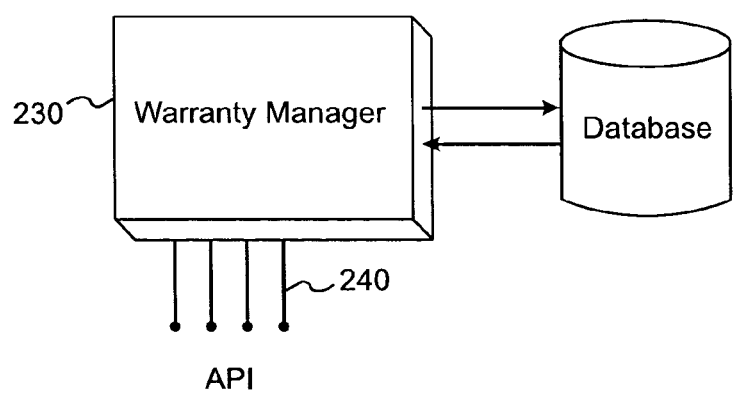
FIG. 11 illustrates an alternative preferred embodiment for implementing a warranty manager.

In a preferred embodiment, warranty manager 230 is implemented as a database application. If desired, warranty manager 230 may be designed as a true message processing application with a messaging queue 235 and other message processing capabilities as shown, for example in FIG. 10. Alternatively, warranty manager 230 may be designed as a function call processing application with no messaging support as shown in FIG. 11.

In a preferred embodiment, warranty manager 230 comprises a warranty manager API 240. API 240 is preferably established by root entity 110 and adapted to process all warranty messages exchanged between a warranty manager 230 and a transaction coordinator 202.

In a preferred embodiment, API 240 is adapted to handle extensible markup language (XML) warranty messages, although other warranty message formats may be supported. API 240 is preferably adapted to enable warranty manager 230 to accept an XML warranty message, parse the contents of the message, and generate a new XML message as output. In order to simplify message processing, warranty manager API 240 is preferably adapted to use a different function to process each of the warranty messages described below.

In a preferred embodiment, API 240 is implemented in C++. Alternatively, if implemented in Java, API 240 preferably follows the same class and method structure as the C++ implementation described below.

In a preferred embodiment, API 240 is implemented as a single inheritance C++ class derived from a generic CObject class with appropriate public methods. All API functions return a boolean value of TRUE if successful, otherwise they return FALSE.

In a preferred embodiment, API 240 is adapted to accept a parameter that sets the environment in which warranty manager 230 operates. The operating environment of warranty manager 230 preferably corresponds to the entity at which warranty manager 230 is implemented. Thus, for example, when initializing or communicating with warranty manager $230_R$ at root entity 110, this parameter is preferably set to a first value and when initializing or communicating with a warranty manager $230_{IP}$ at an issuing participant 102, this parameter is preferably set to a second value.

A preferred embodiment of API 240 is as follows:

A preferred embodiment of API 240 is as follows:

```
typedef struct xmlmsg
{
        char* buffer;   // buffer is sufficiently large to hold entire message
};

class CWarrantyManager : public CObject

{ public:

CWarrantyManager (char startupType)

BOOL WMVersion (unsigned short *vmajor, unsigned short *vminor, char *IPorIR);

BOOL WMAlive(void);

BOOL WMLastError(unsigned errCode, char* errTxt);

BOOL IPRequest (xmlmsg *m2, xmlmsg *m3);

BOOL IRRequest (xmlmsg *m5, xmlmsg *m6);

BOOL IPValidationReport (xmlmsg ipvm);
```

BOOL IRValidationReport (xmlmsg irvm);

BOOL IPWC(xmlmsg ipwcNotify, xmlmsg ipwcResp);

BOOL RTWC(xmlmsg rtwcNotify, xmlmsg rtwcAck);

};

CWarrantyManager::CWarrantyManager

Constructor. Preferably there is only one instance of warranty manager 230 running
CWarrantyManager( char *startup Type*   // Sets the environment in which this warranty manager instance runs

);

Parameters

*startupType* character indicating "IP" for issuing participant 102 or "IR" for root entity 110.

CWarrantyManager::WMVersion

Returns the version of the warranty manager code that is instantiated in this instance of warranty manager 230.
  BOOL WMVersion( unsigned short *vmajor,*   // major version number
    unsigned short *vminor,*   // minor version number
    char *\*PorIR*   // startup type character

);

*vmajor* major version number

*vminor* minor version number

*IP or IR* character indicating "IP" for issuing participant 102 or "IR" for root entity 110.

CWarrantyManager::WMAlive

Returns boolean TRUE if this instance of warranty manager 230 is responding.
    BOOL WMAlive();

Parameters

*none*

CWarrantyManager::WMLastError

Returns the last known error code of warranty manager 230. These error codes are implementor specific.
    BOOL WMLastError( unsigned *errCode,    // numeric error code
        char *errTxt,    // pointer to text buffer
        );

Parameters

*errCode*    pointer to buffer for receiving numeric error code
*erTxt*    pointer to a buffer that will hold the returned error text. Returned text not to exceed 1024 bytes.

CWarrantyManager::IPRequest

Posts a warranty request message to warranty manager $230_{IP}$. This call returns FALSE if the CWarrantyManager startup type is "IR."
    BOOL IPRequest(

```
xmlmsg *m2,        // pointer to input message
xmlmsg *m3,        // pointer to output message
);
```

Parameters

*m2*    Pointer to *xmlmsg* structure holding the input message

*m3*    Pointer to *xmlmsg*

CWarrantyManager::IRRequest

Posts a proposed warranty request message to warranty manager $230_R$. This call returns FALSE if the CWarrantyManager startup type is "IP."

```
BOOL IRRequest( xmlmsg *m5,        // pointer to input message
    xmlmsg *m6,        // pointer to output message
);
```

Parameters

*m5*    Pointer to *xmlmsg* structure holding the input message

*m6*    Pointer to *xmlmsg* structure to receive the output message

CWarrantyManager::IPValidationReport

Posts an issuing participant identity validation reporting message to warranty manager $230_{IP}$. This call should return FALSE if the CWarrantyManager startup type is "IR."

```
BOOL IPValidationReport( xmlmsg *ipvm,      // pointer to input message
);
```

Parameters

*ipvm*   Pointer to *xmlmsg* structure holding the input message

CWarrantyManager::IRValidationReport

Posts a root entity identify validation reporting message to warranty manager $230_R$. This call returns FALSE if the CWarrantyManager startup type is "IP."

BOOL IRValidationReport(

**xmlmsg \*irvm,**      // pointer to input message

);

Parameters

*irvm*    Pointer to *xmlmsg* structure holding the input message

CWarrantyManager::IPWC

Posts a warranty claims message to warranty manager $230_{IP}$. This call returns FALSE if the CWarranty Manager startup type is "IR."

BOOL IPWC(

**xmlmsg \*ipwcNotify,**    // pointer to input message
    **xmlmsg \*ipwcResp,**    // pointer to output message

);

CWarrantyManager::RTWC

Posts a warranty claims message to warranty manager $230_R$. This call returns FALSE if the CWarrantyManager startup type is "IP."

BOOL RTWC(

**xmlmsg \*rtwcNotify,**    // pointer to input message
    **xmlmsg \*rtwcAck,**    // pointer to output message

);

Warranty Messages Specification

As noted above, in a preferred embodiment, the following messages are used in the warranty-issuance process: (1) a warranty request message (Wrequest), (2) a warranty proposed message (Wproposed), (3) a warranty confirmation message (Wconfirmation), (4) a warranty authorized and issued message (Wauthorizedandissued), and (5) a warranty reject message (WReject).

In addition, the following messages are used in the warranty-claim process: (1) a warranty claim request message (WCRequest), (2) a warranty claim notification message (WCNotification), (3) a warranty claim response message (WCResponse), and (4) a warranty claim acknowledgment message (WCAck).

The following messages are used to report the daily number of certificate validations performed by an issuing participant: an issuing participant identity validation reporting message (WIPValidationReporting) and a root entity identity validation reporting message (WIRValidationReporting).

The following message is used to report errors in the warranty process: a warranty error message (Werror).

The following message is used to report a warranted transaction that has been canceled: a warranty canceled message (Wcanceled).

In a preferred embodiment, all warranty messages are defined according to a document type definition (DTD). Root entity 110 preferably establishes a common DTD for system entities. The DTD provides the formal description of all valid XML warranty messages used in the system. Hence, system entities may use the DTD to verify that the messages they transmit and receive are valid. A preferred embodiment of a suitable DTD is described below.

In a preferred embodiment, a complete XML warranty message comprises an XML declaration, a DTD reference, an XML namespace attribute (xmlns), and a set of data elements. An exemplary XML declaration is as follows:

```
<?xml version="1.0" encoding=" UTF-8"?>
<!-- Root Entity Warranty Manager Version 1.0 -->
<!-- Warranty Manager DTD -->
```

An exemplary DTD reference is as follows:

```
<!DOCTYPE WRequest PUBLIC
```

"//Root Entity//WARRANTY MANAGER DTD//EN" "Warranty.dtd">

In a preferred embodiment, an xmlns attribute is used to identify the top-level entity in the DTD, i.e., root entity 110. This is done to prevent conflicts between names used in the warranty-message DTD and other DTDs. The value of the xmlns attribute is preferably fixed and may, for example, be set to "http://www.nameofrootentity.com". An exemplary warranty-message DTD definition of the xmlns attribute is as follows:

```
<!ATTLIST WarrantyRequest
    xmlns CDATA #FIXED "http: //www. rootentity.com"
>
```

A preferred implementation of the data elements included in the above-described XML messages are now described.

FIG. 12 illustrates the data elements used to construct warranty messages in a preferred embodiment of the present system. FIG. 13 provides descriptions and restrictions for each data element in this preferred embodiment.

A warranty request message preferably includes the following data elements:
- Warranty Request Message Code (indicating that the message is a warranty request)
- Warranty Amount
- Warranty Currency Type
- Warranty Claim Period
- Relying Customer Name and Identifier
- Subscribing Customer Name and Identifier
- Subscribing Customer Transaction ID
- Relying Customer Transaction ID
- Timestamp (with acceptable variance of +/- 5 minutes from root entity 110 time)

In a preferred embodiment, the warranty request message may not include any other information, such as the contents of the underlying transaction. A preferred XML implementation for the data elements of this message is:

```
<WRequest>
    <WAmount Currency="USD">100000</WAmount>
```

```
<WClaimPeriod Days="14" />
<RCNameAndId>
    <X509IssuerSerial>
<X509IssuerName>CN=L1B1 Certificate Authority, OU=Root Entity, O=Root Entity, C=US</X509IssuerName>
    <X509SerialNumber>979827336</X509SerialNumber>
    </X509IssuerSerial>
</RCNameAndId>
<SCNameAndId >
    <X509IssuerSerial>
<X509IssuerName>CN=L1B2 Certificate Authority, OU=Root Entity, O=Root Entity, C=US</X509IssuerName>
    <X509SerialNumber>918827438</X509SerialNumber>
    </X509IssuerSerial>
</SCNameAndId >
<SCTransactionId Id="12345631232131678387589" />
<RCTransactionId Id="65432855775334990885891" />
<WRTimestamp DateTime="20000812163000Z" />
</WRequest>
```

A warranty proposed message preferably includes the following data elements:
- Warranty Proposed Message Code (indicating that the message is a proposed warranty)
- Warranty Amount
- Warranty Currency Type
- Warranty Claim Period
- Subscribing Customer Transaction ID
- Relying Customer Transaction ID
- Timestamp
- Issuing Participant Name and Identifier
- Warranty Alternate Currency Amount
- Warranty Alternate Currency Type A preferred XML implementation for the data elements of this message is:

```
<WProposed>
   <WAmount Currency="USD">100000</WAmount>
   <WClaimPeriod Days="14"/>
   <SCTransactionId Id="12345631232131678387589" />
   <RCTransactionId Id="65432855775334990885891" />
   <WRTimestamp DateTime="20000812163000Z"/>
   <IPNameAndId>
      <X509IssuerSerial>
<X509IssuerName>CN=ROOT Certificate Authority, OU=Root Entity, O=Root Entity, C=US</X509IssuerName>
      <X509SerialNumber>916627188</X509SerialNumber>
      </X509IssuerSerial>
   </IPNameAndId>
   <WAlternateAmount Currency="GBP">140000</WAlternateAmount>
</WProposed>
```

A warranty confirmation message preferably includes the following data elements:
- Warranty Confirmation Message Code (indicating that the message is a confirmation of a proposed warranty)
- Warranty ID
- Warranty Amount
- Warranty Currency Type
- Warranty Claim Period
- Subscribing Customer Transaction ID
- Relying Customer Transaction ID
- Timestamp
- Issuing Participant Name and Identifier
- Warranty Alternate Currency Amount
- Warranty Alternate Currency Type
- Warranty Expiration Date and Time A preferred XML implementation for the data elements of this message is:

```
<WConfirmation>
```

```
<WarrantyId Id="9876540123XXXX" />
<WAmount Currency="USD">100000</WAmount>
<WClaimPeriod Days="14"/>
<SCTransactionId Id="12345631232131678387589" />
<RCTransactionId Id="65432855775334990885891" />
<WRTimestamp DateTime="20000812163030Z"/>
<IPNameAndId>
    <X509IssuerSerial>
<X509IssuerName>CN=ROOT Certificate Authority, OU=Root Entity, O=Root Entity, C=US</X509IssuerName>
    <X509SerialNumber>916627188</X509SerialNumber>
    </X509IssuerSerial>
</IPNameAndId>
<WAlternateAmount Currency="GBP">140000</WAlternateAmount>
<ExpiryDate DateTime="20002212090000Z"/>
</ WConfirmation >
```

A warranty authorized and issued message preferably includes the following data elements:

- Warranty Authorized and Issued Message Code (indicating that the message indicates warranty approval and issuance)
- Warranty ID
- Warranty Amount
- Warranty Currency Type
- Warranty Claim Period
- Relying Customer Name and Identifier
- Subscribing Customer Name and Identifier
- Subscribing Customer Transaction ID
- Relying Customer Transaction ID
- Timestamp
- Issuing Participant Name and Identifier
- Warranty Alternate Currency Amount
- Warranty Alternate Currency Type

- Warranty Expiration Date and Time

A preferred XML implementation for the data elements of this message is:

```xml
<WAuthorizedAndIssued >
  <WarrantyId Id="9876540123XXXX" />
  <WAmount Currency="USD">100000</WAmount>
  <WClaimPeriod Days="14"/>
  <RCNameAndId>
    <X509IssuerSerial>
      <X509IssuerName>CN=L1B1 Certificate Authority, OU=Root Entity, O=Root Entity, C=US</X509IssuerName>
      <X509SerialNumber>979827336</X509SerialNumber>
    </X509IssuerSerial>
  </RCNameAndId>
  <SCNameAndId >
    <X509IssuerSerial>
      <X509IssuerName>CN=L1B2 Certificate Authority, OU=Root Entity, O=Root Entity, C=US</X509IssuerName>
      <X509SerialNumber>918827438</X509SerialNumber>
    </X509IssuerSerial>
  </SCNameAndId >
  <SCTransactionId Id="1234563123213167838Z589" />
  <RCTransactionId Id="65432855775334990885891" />
  <WRTimestamp DateTime="200008121630002"/>
  <IPNameAndId>
    <X509IssuerSerial>
      <X509IssuerName>CN=ROOT Certificate Authority, OU=Root Entity, O=Root Entity, C=US</X509IssuerName>
      <X509SerialNumber>916627188</X509SerialNumber>
    </X509IssuerSerial>
  </IPNameAndId>
  <WAlternateAmount Currency="GBP">140000</WAlternateAmount>
  <ExpiryDate DateTime="20002212090000Z"/>
</WAuthorizedAndIssued>
```

A warranty reject message preferably includes the following data elements:
- Warranty Rejected Message Code (indicating that the message is a warranty rejection)
- Reason Code and Text
- Subscribing Customer Transaction ID
- Relying Customer Transaction ID
- Timestamp A preferred set of reason texts for this message when the message is generated by issuing participant 102 is:
- Please contact your relationship manager.
- Subscribing customer 106 exceeds warranty cap.
- Issuing participant 102 is unable to issue a warranty.
- Issuing participant 102 will review warranty request. Please resubmit after 24 hours.
- Issuing participant 102 will review warranty request. Please resubmit after 48 hours.
- Issuing participant 102 will review warranty request. Please resubmit after 72 hours.
- Subscribing customer 106 not known/not a customer of the issuing participant 102.
- Subscribing customer 106 certificate revoked or suspended.

A preferred set of reason texts for this message when the message is generated by root entity 110 is:
- Issuing participant exceeds warranty cap.
- Root entity is unable to verify issuing participant status.

A preferred XML implementation for the data elements of this message is:

```
<WReject Code="200" Reason="Issuing Participant exceeds warranty cap">
    <SCTransactionId Id="12345631232131678387589" />
    <RCTransactionId Id="65432855775334990885891" />
    <WRTimestamp DateTime="20000812163050Z"/>
</WReject>
```

FIG. 14 illustrates the data elements used to construct warranty claim messages in a preferred embodiment of the present system.

A warranty claim request message preferably includes the following data elements:

- Warranty Claim Request Message Code (indicating that the message is a warranty claim request)
- Warranty Authorized and Issued Message Received from Subscribing Customer
- Claim Amount
- Claim Currency Type
- Timestamp A preferred XML implementation for the data elements of this message is:

```
<WCRequest>
  <WAuthorizedAndIssued>
    <WarrantyId Id="9876540123XXXX" />
    <WAmount Currency="USD">100000</WAmount>
    <WClaimPeriod Days="14"/>
    <RCNameAndId>
      <X509IssuerSerial>
<X509IssuerName>CN=L1B1 Certificate Authority, OU=Root Entity, O=Root Entity, C=US</X509IssuerName>
        <X509SerialNumber>979827336</X509SerialNumber>
      </X509IssuerSerial>
    </RCNameAndId>
    <SCNameAndId >
      <X509IssuerSerial>
<X509IssuerName>CN=L1B2 Certificate Authority, OU=Root Entity, O=Root Entity, C=US</X509IssuerName>
        <X509SerialNumber>918827438</X509SerialNumber>
      </X509IssuerSerial>
    </SCNameAndId >
    <SCTransactionId Id="12345631232131678387589" />
    <RCTransactionId Id="65432855775334990885891" />
    <WRTimestamp DateTime="200008121630000Z"/>
```

```
        <IPNameAndId>
            <X509IssuerSerial>
<X509IssuerName>CN=ROOT Certificate Authority, OU=Root Entity, O=Root Entity, C=US</X509IssuerName>
                <X509SerialNumber>916627188</X509SerialNumber>
            </X509IssuerSerial>
        </IPNameAndId>
        <WAlternateAmount Currency="GBP">140000</WAlternateAmount>
        <ExpiryDate DateTime="20002212090000Z"/>
    </WAuthorizedAndIssued>
    <WClaimAmount Currency="USD">100000</WClaimAmount>
    <WRTimestamp DateTime="20000820163000Z"/>
</WCRequest>
```

A warranty claim notification message preferably includes the following data elements:

- Warranty Claim Notification Message Code (indicating that the message is a warranty claim notification)
- Warranty ID
- Warranty Claim Number ID
- Claim Amount
- Claim Currency Type
- Timestamp A preferred XML implementation for the data elements of this message is:

```
<WCNotification>
    <WarrantyId Id="9876540123XXXX" />
    <WClaimNo Id="123456" />
    <WClaimAmount Currency="USD">100000</WClaimAmount>
    <WRTimestamp DateTime="20000820163001Z"/>
</WCNotification>
```

A warranty claim response message preferably includes the following data elements:

- Warranty Claim Response Message Code (indicating that the message is a warranty claim response)
- Warranty ID
- Warranty Claim Number ID
- Claim Amount
- Claim Currency Type
- Timestamp A preferred XML implementation for the data elements of this message is:

```
<WCResponse>
  <WarrantyId Id="9876540123XXXX" />
  <WClaimNo Id="123456" />
  <WClaimAmount Currency="USD">100000</WClaimAmount>
  <WRTimestamp DateTime="20000820163001Z"/>
</WCResponse>
```

A warranty claim acknowledgment message preferably includes the following data elements:

- Warranty Claim Acknowledgment Message Code (indicating that the message is a warranty claim acknowledgment)
- Warranty ID
- Warranty Claim Number ID
- Claim Amount
- Claim Currency Type
- Timestamp A preferred XML implementation for the data elements of this message is:

```
<WCAck>
  <WarrantyId Id="9876540123XXXX" />
  <WClaimNo Id="123456" />
  <WClaimAmount Currency="USD">100000</WClaimAmount>
  <WRTimestamp DateTime="20000820163001Z"/>
</WCAck>
```

FIG. 15 shows a preferred list of data elements, and corresponding descriptions and restrictions, used to construct validation reporting messages that may be used to report the number of validations performed by a participant in a preferred embodiment of the present system.

An issuing participant validation reporting message preferably includes the following data elements:
- An Issuing Participant Validation Reporting Message Code (indicating that the message is an issuing participant validation reporting message)
- Validation Count
- Validation Period
- Timestamp A preferred XML implementation for the data elements of this message:

```
<WIPValidationReporting >
    <IPValidation Count="125"/>
    <PeriodFrom DateTime="20000912163050Z"/>
    <PeriodTo DateTime="20001012163050Z"/>
    <WRTimestamp DateTime="20001012163050Z"/>
</WIPValidationReporting >
```

A root validation reporting message preferably includes the following data elements:
- A Root Entity Validation Reporting Message Code (indicating that the message is a root entity validation reporting message)
- Issuing Participant Name and Identifier
- Validation Count
- Validation Period
- Timestamp A preferred XML implementation for the data elements of this message is:

```
<WIRValidationReporting>
    <IPNameAndId Id="987654" Name="IP1"/>
    <IPValidation Count="125"/>
    <PeriodFrom DateTime="20000912163050Z"/>
```

```
    <PeriodTo DateTime="20001012163050Z"/>
  <WRTimestamp DateTime="20001012163050Z"/>
</WIRValidationReporting>
```

If an error occurs during the warranty process, then a warranty error message is generated. A warranty error message preferably includes the following data elements:
- An Error Message Code (indicating that the message reports an error in the warranty process)
- Error Code and Description
- Subscribing Customer Transaction ID
- Relying Customer Transaction ID
- Timestamp A preferred XML implementation for the data elements of this message is:

```
<WError Code="901" Description="Warranty Amount must be greater than 500 USD">
    <SCTransactionId Id="12345631232131678387589" />
  <RCTransactionId Id="65432855775334990885891" />
  <WRTimestamp DateTime="20000812163050Z"/>
</Werror>
```

If the transaction between subscribing customer 106 and relying customer 108 does not take place, then a warranty canceled message is generated by the entity that requested the warranty and transmitted to the warranty issuer. Upon receipt of the warranty canceled message, the warranty amount is preferably released from both the requestor's and the issuer's warranty cap utilization. A warranty canceled message preferably includes the following data elements:
- A Warranty Canceled Message Code (indicating that the entity that requested the warranty wishes to cancel the warranty)
- Date and Time Canceled
- Warranty ID A preferred XML implementation for the data elements of this message is:

```
<Wcanceled>
```

```
        <DateTime Canceled="2000 2120900002"/>
        <WarrantyId Id=987640123XXXX">
</Wcanceled>
```

A preferred embodiment of a DTD for warranty messages is as follows:

```
<?xml version="1.0" encoding="UTF-8"?>
<!-- Root Entity Warranty Manager Version 1.0 -->
<!-- Warranty Manager DTD -->
<!--
Warranty=WRequest|WProposed|WConfirmation|WAuthorizedAndIssued|WReject|WIRValidationReporting|WIPValidationReporting|WError -->

<!ENTITY % XMLDSIG.dtd PUBLIC "-//W3C//XMLDSIG//EN" "http://www.root
entity.com/TC/2.0/XMLDSIG.dtd">
%XMLDSIG.dtd;

<!ELEMENT WRequest
(WAmount,WClaimPeriod,RCNameAndId,SCNameAndId,SCTransactionId,RCTransactio
nId,WRTimestamp)>
<!ELEMENT WAmount (#PCDATA)>
<!ATTLIST WAmount
        Currency CDATA #REQUIRED
>
<!ELEMENT WClaimPeriod EMPTY>
<!ATTLIST WClaimPeriod
        Days CDATA #REQUIRED
>
<!ELEMENT RCTransactionId EMPTY>
<!ATTLIST RCTransactionId
        Id CDATA #REQUIRED
>
<!ELEMENT SCTransactionId EMPTY>
<!ATTLIST SCTransactionId
```

```
            Id CDATA #REQUIRED
    >
    <!ELEMENT RCNameAndId (X509IssuerSerial)>
    <!ELEMENT SCNameAndId (X509IssuerSerial)>
    <!ELEMENT IPNameAndId (X509IssuerSerial)>

<!ELEMENT WRTimestamp EMPTY>
    <!ATTLIST WRTimestamp
            DateTime CDATA #REQUIRED
    >
    <!ELEMENT WProposed
    (WAmount,WClaimPeriod,SCTransactionId,RCTransactionId,WRTimestamp,IPNameAndId,WAlternateAmount?)>

<!ELEMENT WAlternateAmount (#PCDATA)>
    <!ATTLIST WAlternateAmount
            Currency CDATA #REQUIRED
    >
    <!ELEMENT WConfirmation
    (WarrantyId,WAmount,WClaimPeriod,SCTransactionId,RCTransactionId,WRTimestamp,IPNameAndId,WAlternateAmount?,ExpiryDate)>
    <!ELEMENT WarrantyId EMPTY>
    <!ATTLIST WarrantyId
            Id CDATA #REQUIRED
    >
    <!ELEMENT ExpiryDate EMPTY>
    <!ATTLIST ExpiryDate
            DateTime CDATA #REQUIRED
    >
    <!ELEMENT WAuthorizedAndIssued
    (WarrantyId,WAmount,WClaimPeriod,RCNameAndId,SCNameAndId,SCTransactionId,RCTransactionId,WRTimestamp,IPNameAndId,WAlternateAmount?,ExpiryDate)>

<!ELEMENT WReject (SCTransactionId,RCTransactionId,WRTimestamp)>
    <!ATTLIST WReject
```

```
        Code CDATA #REQUIRED
        Reason CDATA #REQUIRED
>

<!ELEMENT WIRValidationReporting (IPNameAndId, IPValidation, PeriodFrom,
PeriodTo, WRTimestamp)>

<!ELEMENT WIRAck (IPNameAndId, IPValidation, PeriodFrom, PeriodTo,
WRTimestamp)>

<!ELEMENT IPValidation EMPTY>
<!ATTLIST IPValidation
    Count CDATA #REQUIRED
>

<!ELEMENT PeriodFrom EMPTY>
<!ATTLIST PeriodFrom
    DateTime CDATA #REQUIRED
>

<!ELEMENT PeriodTo EMPTY>
<!ATTLIST PeriodTo
    DateTime CDATA #REQUIRED
>

<!ELEMENT WIPValidationReporting (IPValidation, PeriodFrom, PeriodTo,
WRTimestamp)>

<!ELEMENT WError (SCTransactionId?,RCTransactionId?,WRTimestamp)>
<!ATTLIST WError
        Code CDATA #REQUIRED
        Description CDATA #REQUIRED
>
<!ELEMENT WCRequest (WAuthorizedAndIssued, WClaimAmount, WRTimestamp)>
<!ELEMENT WClaimNo EMPTY>
```

```
<!ATTLIST WClaimNo
    Id CDATA #REQUIRED
>
<!ELEMENT WClaimAmount (#PCDATA)>
<!ATTLIST WClaimAmount
    Currency CDATA #REQUIRED
>
<!ELEMENT WCNotification (WarrantyId, WClaimNo, WClaimAmount, WRTimestamp)>
<!ELEMENT WCAck (WarrantyId, WClaimNo, WClaimAmount, WRTimestamp)>
<!ELEMENT WCResponse (WarrantyId, WClaimNo, WClaimAmount, WRTimestamp)>
```

An alternative embodiment for implementing the the above-described messages and DTD is described in U.S. provisional application serial No. 60/ 259,796, filed January 4, 2001, entitled Warranty Manager Application Programming Interface, Warranty Messaging Specification, and Warranty Manager Functional Requirements, which is hereby incorporated by reference.

While the invention has been described in conjunction with specific embodiments, it is evident that numerous alternatives, modifications, and variations will be apparent to those skilled in the art in light of the foregoing description.

An alternative embodiment for implementing the above-described messages and DTD is described in U.S. provisional application Ser. No. 60/259,796, filed Jan. 4, 2001, entitled Warranty Manager Application Programming Interface, Warranty Messaging Specification, and Warranty Manager Functional Requirements, which is hereby incorporated by reference.

While the invention has been described in conjunction with specific embodiments, it is evident that numerous alternatives, modifications, and variations will be apparent to those skilled in the art in light of the foregoing description.

The invention claimed is:

1. A method for providing warranties that warrant at least one fact associated with a digitally-signed electronic message, said method comprising the steps of:

assigning a warranty cap to an entity that issues digital certificates;

tracking a warranty volume for the entity;

receiving a request for a warranty from a subscriber to whom the entity issued a digital certificate, the request for the warranty specifying a warranted amount and claim period;

evaluating the request for the warranty to ensure that the warranted amount will not cause the entity's warranty volume to exceed the entity's warranty cap;

transmitting a message that confirms issuance of the requested warranty, the message being digitally signed by a component maintained by the entity, the warranty comprising a contract between the entity and the subscriber, a relying party being a third-party beneficiary to the contract;

the relying party sending a validation request to a relying participant, said relying participant being in communication with said entity, the validation request requesting validation of the digital certificate of said component; and said relying participant transmitting a validation response to the relying party.

* * * * *